(12) United States Patent
Kondo et al.

(10) Patent No.: US 12,099,644 B2
(45) Date of Patent: Sep. 24, 2024

(54) INFORMATION PROCESSING APPARATUS AND INFORMATION PROCESSING METHOD

(71) Applicant: SONY GROUP CORPORATION, Tokyo (JP)

(72) Inventors: Akane Kondo, Tokyo (JP); Tomoya Narita, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/754,570

(22) PCT Filed: Aug. 27, 2020

(86) PCT No.: PCT/JP2020/032390
§ 371 (c)(1),
(2) Date: Apr. 6, 2022

(87) PCT Pub. No.: WO2021/075161
PCT Pub. Date: Apr. 22, 2021

(65) Prior Publication Data
US 2024/0061495 A1    Feb. 22, 2024

(30) Foreign Application Priority Data
Oct. 15, 2019    (JP) .................................. 2019-188950

(51) Int. Cl.
*G06F 3/01*    (2006.01)
*G06F 3/042*    (2006.01)

(52) U.S. Cl.
CPC ............ *G06F 3/011* (2013.01); *G06F 3/0425* (2013.01)

(58) Field of Classification Search
CPC ............ G02B 27/0179; G02B 27/0093; G02B 2027/0187; G02B 2027/0138;
(Continued)

(56) References Cited

U.S. PATENT DOCUMENTS 11,748,992 B2 *    9/2023    Poursohi ............... G06T 19/006
345/419
2006/0014531 A1    1/2006    Nam et al.
(Continued)

FOREIGN PATENT DOCUMENTS

CN    111108531 A    5/2020
DE    112018004313 T5    5/2020
(Continued)

OTHER PUBLICATIONS

International Search Report and Written Opinion of PCT Application No. PCT/JP2020/032390, issued on Nov. 24, 2020, 09 pages of ISRWO.

*Primary Examiner* — Bryan Earles
(74) *Attorney, Agent, or Firm* — CHIP LAW GROUP

(57) ABSTRACT

Provided is an information processing apparatus according to an embodiment includes a setting unit that, based on basic trigger region information defining a basic trigger region which is to be a trigger of an occurrence of an event in an application that presents predetermined content to a user based on position information regarding the user within a real space, determines an extended trigger region having a predetermined positional relationship with the basic trigger region, and sets information defining the determined extended trigger region onto a storage unit.

14 Claims, 18 Drawing Sheets

(58) Field of Classification Search
CPC ... G02B 27/0172; G06F 3/0425; G06F 3/011; G06F 3/017; G06F 3/016; G06F 3/147; G06F 3/012; G09G 2354/00; G09G 5/38; G06V 20/20; G06V 40/19; G06V 40/20
See application file for complete search history.

(56) References Cited

U.S. PATENT DOCUMENTS

| | | |
|---|---|---|
| 2014/0031131 A1 | 1/2014 | Ackley et al. |
| 2015/0024368 A1* | 1/2015 | King, Jr. ................ G09B 5/02 434/365 |
| 2016/0332074 A1* | 11/2016 | Marr ...................... A63F 13/55 |
| 2016/0350973 A1* | 12/2016 | Shapira .................. G06F 3/011 |
| 2018/0293798 A1* | 10/2018 | Energin ................. G06F 9/445 |
| 2018/0357836 A1* | 12/2018 | Ishiguro ................. G06F 3/012 |
| 2018/0374026 A1* | 12/2018 | Osawa ................... G06F 9/453 |
| 2019/0102939 A1* | 4/2019 | He ......................... A63F 13/65 |
| 2020/0054947 A1* | 2/2020 | Wu ....................... A63F 13/537 |
| 2020/0294265 A1 | 9/2020 | Kimura |

FOREIGN PATENT DOCUMENTS

| | | | |
|---|---|---|---|
| JP | 2016-169080 A | 9/2016 | |
| KR | 10-2006-0005674 A | 1/2006 | |
| KR | 10-2020-0060361 A | 5/2020 | |
| WO | 2019/064872 A1 | 4/2019 | |

\* cited by examiner

FIG.4

| PLAYER ID | GROUP ID | CONTENT ID | CONTEXT | POSITION INFORMATION | POSITION TRIGGER RESERVATION STATUS | ... |
|---|---|---|---|---|---|---|
| p001 | g001 | C001 | GATE A → PASSING BRIDGE A | POSITION 001 | AREA E100 | ... |
| p002 | g001 | C001 | GATE A → PASSING BRIDGE A | POSITION 002 | AREA E101 | ... |
| p003 | g001 | C001 | GATE A → BEFORE PASSING BRIDGE A | POSITION 003 | AREA E102 | ... |
| p011 | g002 | C010 | PASSING GATE B → BEFORE PASSING POND | POSITION 011 | NONE | ... |
| p012 | g002 | C010 | PASSING GATE B | POSITION 012 | NONE | ... |
| p013 | g002 | C010 | PASSING GATE B | POSITION 013 | NONE | ... |
| p021 | | C020 | BEFORE PASSING GATE C | POSITION 021 | NONE | ... |
| ... | ... | ... | ... | ... | ... | ... |

# INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/032390 filed on Aug. 27, 2020, which claims priority benefit of Japanese Patent Application No. JP 2019-188950 filed in the Japan Patent Office on Oct. 15, 2019. Each of the above-referenced applications is hereby incorporated herein by reference in its entirety.

FIELD

The present disclosure relates to an information processing apparatus, an information processing method, and an information processing program.

BACKGROUND

In recent years, there is a technology that has attracted attention and referred to as an Augmented Reality (AR) technology by which additional information is superimposed onto the real space so as to be presented to the user. The use of this AR technology makes it possible to superimpose virtual content in various forms such as text, icons, or animations on an object in the real space and present the product to the user.

Applications such as Location Based Entertainment (LBE) games, which are experience-based events, have begun to be supplied, together with promotions of technologies for achieving efficient progress of the games.

CITATION LIST

Patent Literature

Patent Literature 1: U.S. Patent Application Publication No. 2014/0031131

SUMMARY

Technical Problem

In applications that apply AR technology and use the real space, it is expected that a plurality of users will participate at the same time. In this case, there are some users participating on a group-by-group basis, and thus it is required to control to achieve smooth progress of application in various user participation modes.

In view of this, the present disclosure proposes an information processing apparatus, an information processing method, and an information processing program capable of performing control to achieve smooth progress of an application in various user participation modes.

Solution to Problem

To solve the above problem, an information processing device that provides a service that requires an identity verification process according to an embodiment of the present disclosure includes: a setting unit that, based on basic trigger region information defining a basic trigger region which is to be a trigger of an occurrence of an event in an application that presents predetermined content to a user based on position information regarding the user within a real space, determines an extended trigger region having a predetermined positional relationship with the basic trigger region, and sets information defining the determined extended trigger region onto a storage unit.

BRIEF DESCRIPTION OF DRAWINGS

FIG. 4 is a diagram illustrating an example of player information according to an embodiment.

DESCRIPTION OF EMBODIMENTS

Figure 1:
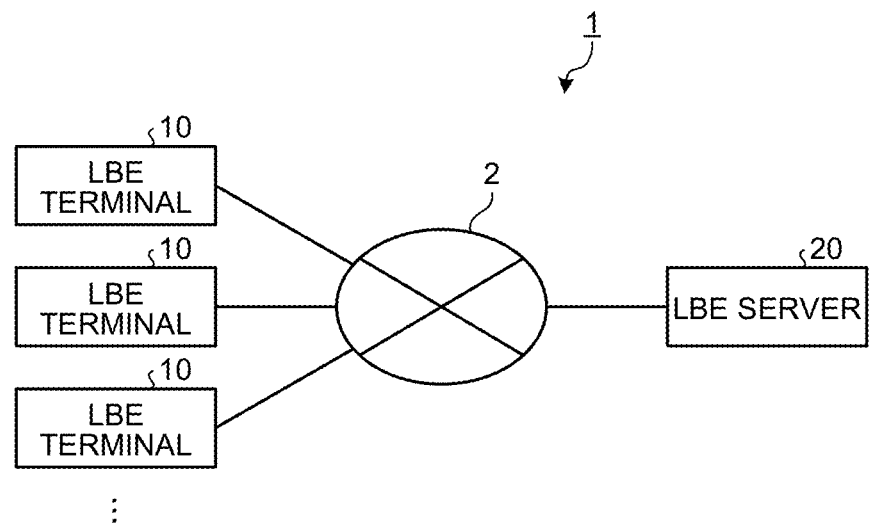
FIG. 1 is a diagram illustrating a configuration example of an information processing system according to an embodiment.

Embodiments of the present disclosure will be described below in detail with reference to the drawings. In each of the following embodiments, the same parts are denoted by the same reference signs, and a repetitive description thereof will be omitted in some cases.

Furthermore, in the following embodiment, when it is not necessary to particularly distinguish between a plurality of components having substantially the same functional configuration, the components will be described with the same reference sign and with no particular distinction, such as an extended trigger region ETA, for example.

The embodiment of the present disclosure will describe an example of controlling the progress of an LBE game using the AR technology of superimposing various types of information on the real space and presenting the product to the user. The embodiment of the present disclosure assumes that a plurality of players participates in the LBE game at the same time. Although the embodiment of the present disclosure uses an LBE game as an exemplary application, and uses an LBE game player as an exemplary user who executes the application, the embodiment of the present disclosure does not have to be particularly limited to this example. For example, the embodiment of the present disclosure is similarly applicable to various applications and the like that use user's position information, such as various game applications that utilize the user's position information and applications that provide tourist spot guidance.

The present disclosure will be described in the following order.

1. Overview
2. Configuration examples
3. Processing procedure examples
4. Modification of extended trigger region
5. Hardware configuration
6. Conclusion

1. Overview

An LBE game is considered to be played in groups of a plurality of players. For example, when the number of players increases, simply allocating an additional play area to another location would cause hindrance of the movement on a group-by-group basis or difficulty in the control of the distance between the groups.

When a plurality of persons plays an LBE game in a certain area, the same action is required at the same timing and in the same area, which can cause collision between the users. U.S. Patent Application Publication No. 2014/0031131 proposes to control the progress of the game by taking measures of subdividing the area and allocating an individual event occurrence area to each of the users, and the like. In addition, U.S. Patent Application Publication No. 2014/0031131 proposes measures of allocating different tasks to each of the users depending on the start time and state of the game, sending out a message to keep other users waiting without entering the currently crowded area, and the like.

However, U.S. Patent Application Publication No. 2014/0031131 is merely a measure for individual users, not a measure for the smooth progress of the game on a group-by-group basis.

In view of this, the embodiment of the present disclosure proposes an information processing apparatus capable of performing control to achieve smooth progress of the game on a group-by-group basis when a plurality of players participates in the LBE game at the same time. As will be described in detail below, the information processing apparatus according to the embodiment controls an LBE game utilizing the AR technology that superimposes additional information on the real space and augments the real environment perceived by humans. At this time, based on basic trigger region information that defines a basic trigger region, the information processing apparatus according to the embodiment determines an extended trigger region having a predetermined positional relationship with the basic trigger region. This makes it possible to perform control to achieve smooth progress of the game (an example of the application) in various user participation modes. In the following description, the basic trigger region and the extended trigger region that function as position triggers will be simply referred to as position triggers, in some cases.

2. Configuration Examples

2-1. System Configuration

FIG. 1 is a diagram illustrating a configuration example of an information processing system according to an embodiment. An information processing system 1 according to the embodiment includes a plurality of LBE terminals 10 and an LBE server 20. The LBE terminal 10 is worn by a player of an LBE game. The LBE terminal 10 connects to a communication network 2 and performs data communication with the LBE server 20 via the communication network 2. The LBE server 20 controls the progress of the LBE game. The LBE server 20 connects to the communication network 2 and performs data communication with each of the plurality of LBE terminals 10 via the communication network 2.

Figure 2:
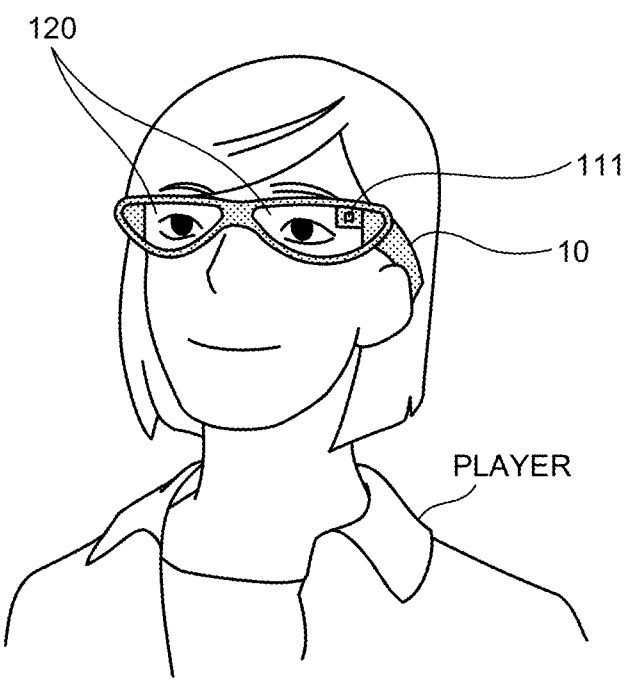
FIG. 2 is a diagram illustrating an example of a terminal device according to an embodiment.

An example of a terminal device worn by a player participating in an LBE game will be described with reference to FIG. 2. FIG. 2 is a diagram illustrating an example of a terminal device according to the embodiment. As illustrated in FIG. 2, the LBE terminal 10 (an example of a terminal device) according to the embodiment is implemented by an eyeglass type wearable terminal referred to as a Head Mounted Display (HMD) worn on the head of a player, for example. A display unit 120 corresponding to an eyeglass lens portion located in front of the user's eyes when worn may be a display referred to as an optical see-through display having optical transparency, or may be a shielding type display.

When the LBE game is a piece of optical see-through AR content in which the surrounding environment is confirmed through the display of the display unit 12, it is possible to utilize a transmissive HMD using an optical see-through display. When the LBE game is a piece of video see-through AR content in which a video image of the surrounding environment is confirmed on a display, it is possible to utilize an HMD using a shielding type display. In the embodiment described below, an example of using an HMD as the LBE terminal 10 will be described. However, when the LBE game is a piece of video see-through type AR content, the LBE terminal 10 may be actualized by using a mobile device such as a smartphone or tablet having a display.

By displaying a virtual object on the display unit 120, the LBE terminal 10 can present the virtual object in the player's field of view. That is, the LBE terminal 10 can function as a terminal referred to as an Augmented Reality (AR) terminal that controls to display a virtual object on the transparent display unit 120 so that the virtual object can be viewed as being superimposed on the real space so as to implement augmented reality. The HMD, which is an example of the LBE terminal 10, is not limited to the one that presents an image to both eyes, and may present the image to only one eye.

Furthermore, the LBE terminal 10 is provided with an outward camera 111 that captures a user's face direction (that is, head direction) when worn. The outward camera 111 may be provided in plurality. Furthermore, although not illustrated in FIG. 1, the LBE terminal 10 may include various sensors such as a 9-dof sensor, a positioning unit, and a biometric information positioning unit, provided for recognizing the behavior of the player.

Furthermore, the shape of the LBE terminal 10 is not limited to the example illustrated in FIG. 1. The LBE terminal 10 may be a headband type HMD (including a type to be worn with a band wound around the entire circumference of the head, and a case including a band passing through the crown as well as the temporal region) or a helmet type HMD (visor portion of the helmet corresponds to the display unit 120).

Here, for example, when the display unit 120 has optical transparency, the player can visually recognize information displayed on the display unit 120 while visually recognizing the real space through the display unit 120. Therefore, it can be said that the virtual object displayed on the display unit 120 is displayed in the real space.

Furthermore, control can be performed to enable the player to feel as if a virtual object exists in the real space. For example, it is possible to control the arrangement, shape, and the like of a virtual object based on information in the real space obtained by imaging performed by the outward camera 111, for example, the information regarding the position and shape of the real object existing in the real space.

The virtual objects displayed on the display unit 120 can be diverse. For example, the virtual object is displayed based on the application installed in the LBE terminal 10. The application installed in the LBE terminal 10 provides various functions related to the LBE game. The application makes it possible to display virtual objects superimposed on locations such as amusement facilities where LBE games are played and display various types of information related to LBE games.

2-2. Functional Configuration Example 2-2-1. LBE Terminal

Figure 3:
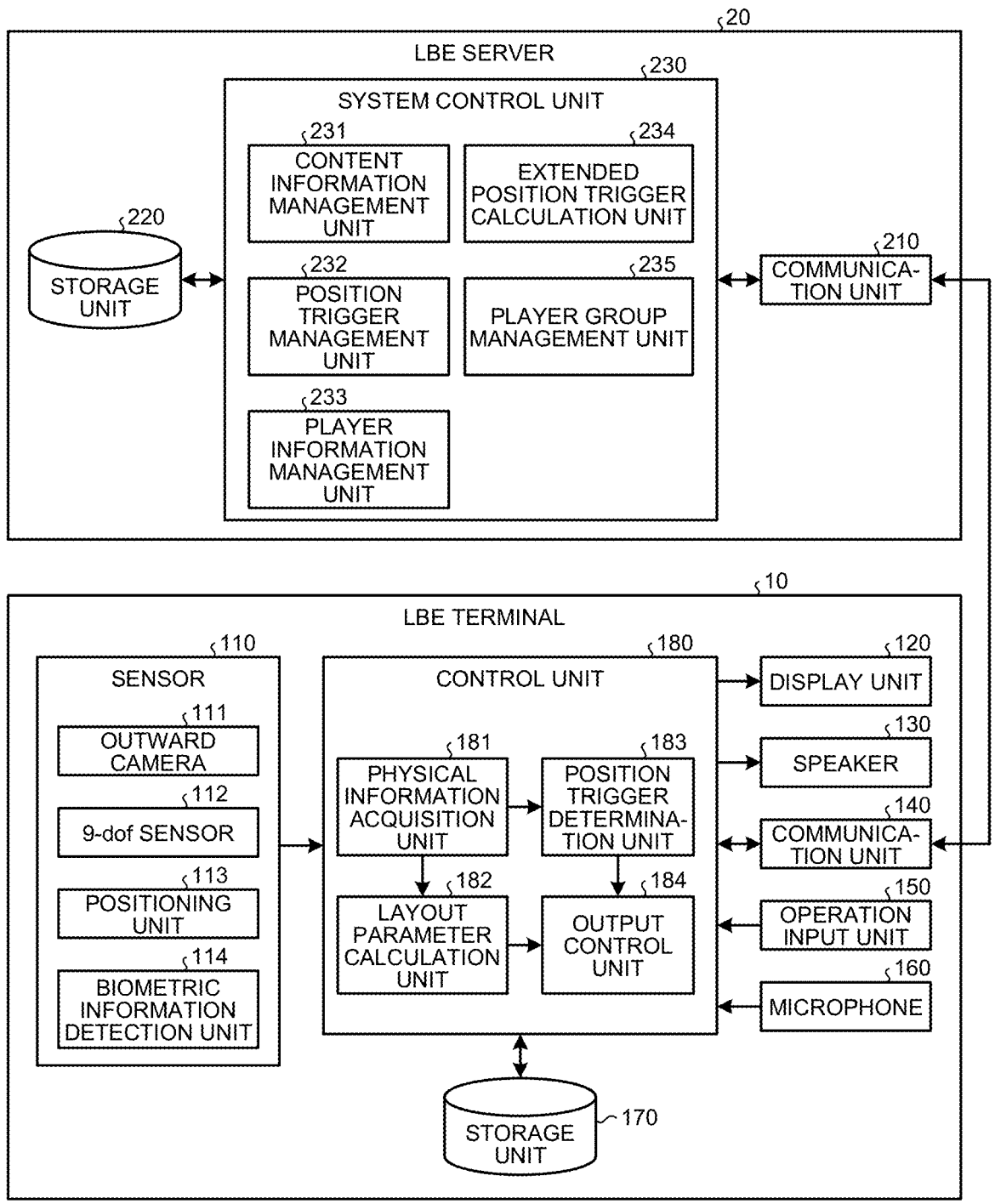
FIG. 3 is a diagram illustrating a functional configuration example of an information processing system according to an embodiment.

FIG. 3 is a diagram illustrating a functional configuration example of an information processing system according to the embodiment. As illustrated in FIG. 3, the LBE terminal 10 includes a sensor unit 110, the display unit 120, a speaker 130, a communication unit 140, an operation input unit 150, a microphone 160, a storage unit 170, and a control unit 180.

The sensor unit 110 includes the outward camera 111, a 9 degrees of freedom (9-dof) sensor 112, a positioning unit 113, and a biometric information detection unit 114. The configuration of the sensor unit 110 illustrated in FIG. 3 is an example, and the configuration is not particularly limited to the configuration illustrated in FIG. 3 For example, in addition to each part illustrated in FIG. 3, it is allowable to include various sensors such as an inward camera, an environment sensor such as an illuminance sensor and a temperature sensor, an ultrasonic sensor, and an infrared sensor, and each sensor may be provided as a single sensor or a plurality of sensors.

The outward camera 111 captures an image around the player. The outward camera 111 acquires information for recognizing external information and estimating the relative self-position of the player. It is desirable that the angle of view and orientation of the outward camera 111 are set so as to capture the user's head direction (face direction) in the real space when the camera is worn. Furthermore, the outward cameras 111 may be provided in plurality. Furthermore, the outward camera 111 may include a depth camera capable of acquiring a depth map by sensing.

For example, the outward camera 111 includes a lens system, a drive system, a fixed image sensor array, and the like. The lens system is composed of an imaging lens, an aperture, a zoom lens, a focus lens, and the like. The drive system drives the lens system to perform a focus operation and a zoom operation. The solid-state image sensor array photoelectrically converts the imaged light obtained by the lens system to generate an imaging signal. The solid-state image sensor array can be implemented by a Charge Coupled Device (CCD) or a Complementary Metal Oxide Semiconductor (CMOS). The outward cameras 111 may be provided in plurality.

The 9-dof sensor 112 acquires information for estimating the relative self-position and posture of the player (LBE terminal 10). The 9-dof sensor 112 is an inertial measurement unit with nine degrees of freedom, and is composed of a 3-axis acceleration sensor, a 3-axis gyro sensor, and a 3-axis geomagnetic sensor. The 9-dof sensor 112 detects the acceleration acting on the player (LBE terminal 10), the angular velocity (rotational speed) acting on the player (LBE terminal 10), and the absolute orientation of the player (LBE terminal 10).

The positioning unit 113 acquires the current position (absolute position) of the player (LBE terminal 10) by the positioning function. For example, the positioning unit 113 can have a positioning function for acquiring information regarding the current position of the player (LBE terminal 10) based on an acquisition signal from the outside. The positioning unit 113 can position the current position of the player (LBE terminal 10) based on a radio signal received from a Global Navigation Satellite System (GNSS), for example. The positioning unit 113 can also use acquisition signals from a Global Positioning System (GPS), Beidou, a Quasi-Zenith Satellite System (QZSS), Galileo, and an Assisted Global Positioning System (A-GPS). The information acquired by the positioning unit 113 can include information related to latitude, longitude, altitude, and positioning error. Furthermore, the information acquired by the positioning function may be the coordinates of the X-axis, the Y-axis, and the Z-axis having a specific geographical position as the origin, and may include information indicating outdoor or indoor together with these coordinates. In addition, the positioning unit 113 may include a function of detecting the current position of the player (LBE terminal 10) by communication such as Wi-Fi (registered trademark), Bluetooth (registered trademark), transmission/reception with a communication device such as a smartphone, or short-range communication, for example.

Furthermore, the positioning unit 113 may estimate the current position of the player (LBE terminal 10) by using the method of Simultaneous Localization And Mapping (SLAM). The SLAM method can use any algorithm. For example, it is allowable to use an algorithm that recognizes a characteristic object as a landmark, generates a map of the landmark expressed in point coordinates on the map, and performs feedback of the coordinate information regarding the landmark to the estimation of the current position of the player (LBE terminal 10).

The biometric information detection unit 114 detects biometric information regarding the player. Biometric information includes body temperature, veins, pulse rate, heart rate, perspiration, blood pressure, electroencephalogram, electrooculogram, electromyogram, and the like.

The display unit 120 displays a virtual image. The display unit 120 can be implemented by devices such as a lens unit that displays using hologram optical technology, a liquid crystal display (LCD) device, and an Organic Light Emitting Diode (OLED) device.

The speaker 130 is a sound output device, and outputs sounds and the like provided from the content of the LBE game in conjunction with the LBE game.

The communication unit 140 is implemented by a communication module for transmitting/receiving data to/from another device by a wired or wireless channel. The communication unit 140 supports various communication schemes for communicating with other devices. Communication schemes supported by the communication unit 140 include wired Local Area Network (LAN), wireless LAN, Wireless Fidelity (Wi-Fi, registered trademark), infrared communication, Bluetooth (registered trademark), short-range communication, and non-contact communication. Furthermore, the communication standard supported by the communication unit 140 can support the communication schemes of the cellular communication network such as Long Term Evolution (LTE), 3G, 4GLTE, 4G, and 5G. The communication unit 140 performs data communication with the LBE server 20 and can transmit and receive various types of information related to the LBE game to and from the LBE server 20.

The operation input unit 150 is implemented by an operation member having a physical structure such as a switch, a button, or a lever, and is used to input operation information of the player. The microphone 160 is a sound input device used to input player's voice information and the like.

The storage unit 170 stores programs and data used to actualize various functions of the LBE terminal 10. The storage unit 170 is implemented by semiconductor memory elements such as random access memory (RAM) and flash memory, or other storage devices such as a hard disk or an optical disc, for example. The storage unit 170 is also used for parameters used in various processes, or as a work area for a variety of processes, and the like. The storage unit 170 can store position information regarding the LBE terminal 10, the application (program) that provides various functions of the LBE game, the three-dimensional object and layout information regarding the LBE game, the position trigger information, and the like.

The control unit 180 controls various processes executed in the LBE terminal 10. The control unit 180 is actualized by execution of various programs stored in a storage device inside the LBE terminal 10 by, for example, a central processing unit (CPU), a micro processing unit (MPU), or the like, using the RAM as a work area. Furthermore, the control unit 180 is actualized by, for example, an integrated circuit such as an application specific integrated circuit (ASIC) or a field programmable gate array (FPGA). The control unit 180 includes a physical information acquisition unit 181, a layout parameter calculation unit 182, a position trigger determination unit 183, and an output control unit 184.

The physical information acquisition unit 181 integrates the information detected by the sensor unit 110 to calculate the final position, posture, and the like of the player.

The layout parameter calculation unit 182 generates three-dimensional display information superimposed on the player's field of view based on the final position, posture, and the like of the player calculated by the physical information acquisition unit 181. The final position of the player is determined based on the positional relationship between the player's current position and the position trigger determined by the position trigger determination unit 183, which will be described below.

The position trigger determination unit 183 determines whether the player satisfies determination conditions of the basic trigger region and the extended trigger region that work as position triggers. For example, the position trigger determination unit 183 calculates the positional relationship between the player's current position and the position trigger based on the position trigger information acquired from the LBE server 20, and determines an arrival, passage, approach, or the like with respect to the position trigger based on the calculated positional relationship. The positional relationship between the player and the position trigger can be used, for example, as an analog value indicating the distance between the player and the position trigger calculated based on the measurement result of the positioning unit 113, a command defined in advance according to the distance between the player and the position trigger, or the like. With a configuration in which the LBE terminals 10 are connected to each other via a peer-to-peer network and share position information with each other, position trigger control (determination of the necessity of an extended trigger region, etc.) can be executed in the local environment of the LBE terminal 10.

The output control unit 184 executes preprocessing for performing display using superimposition of virtual three-dimensional display information onto the real space expanding in the player's field of view.

2-2-2. LBE Server

As illustrated in FIG. 3, the LBE server 20 includes a communication unit 210, a storage unit 220, and a system control unit 230.

The communication unit 210 is implemented by a communication module for transmitting/receiving data to/from another device by a wired or wireless channel. The communication unit 210 supports various communication schemes for communicating with other devices. The communication unit 210 performs data communication with the LBE terminal 10 including transmission/reception of various types of information related to the LBE game.

The storage unit 220 stores programs and data used for various controls of the system control unit 230. The storage unit 220 is implemented by semiconductor memory elements such as random access memory (RAM) and flash memory, or other storage devices such as a hard disk or an optical disc. The storage unit 220 stores programs and data for actualizing various controls of the LBE game, and player information related to a player currently playing the LBE game. The storage unit 220 can store information that defines a position trigger such as a basic trigger region and an extended trigger region, as data for actualizing various controls of the LBE game. The position trigger can be defined by the center position of the position trigger and a predetermined range (region) based on the center position, for example. Information indicating the center position of the position trigger can include information related to latitude, longitude, altitude, and positioning error. Furthermore, the information defining the center position of the position trigger may be coordinates of the X-axis, the Y-axis, and the Z-axis having the origin at a specific geographical position, and may include information indicating outdoor or indoor together with the coordinates. Furthermore, a predetermined range (region) based on the center position of the position trigger can be defined by the distance from the center position.

FIG. 4 is a diagram illustrating an example of player information according to the embodiment. As illustrated in FIG. 4, the player information stored in the storage unit 220 has items such as a player ID, a group ID, context, position information, and a position trigger reservation status, and these items are associated with each other. The item of player ID stores player identification information for specifying a player. The item of group ID stores group identification information for specifying the group to which the player belongs. The item of context stores information indicating the progress of the player's game and the player's action history. The progress of the game may include a game progress level defined in the LBE game, information regarding the position trigger through which the player has passed, and the like. Furthermore, the action history of the player may include the movement route of the player in the LBE game, the selection history by the player in the LBE game, and the like. The item of position trigger selection and position information stores information regarding the player's current position. The items of position trigger reservation status stores information regarding the reservation status indicating whether the position trigger has been reserved.

The system control unit 230 includes a content information management unit 231, a position trigger management unit 232, a player information management unit 233, an extended position trigger calculation unit 234, and a player group management unit 235. By using these individual units, the system control unit 230 controls various processes of the LBE server 20. The individual units of the system control unit 230 is actualized by execution of various programs stored in a storage device inside the LBE terminal 10 by, for example, a central processing unit (CPU), a micro processing unit (MPU), or the like, using the RAM as a work area. Furthermore, the system control unit 230 is actualized by, for example, an integrated circuit such as an application specific integrated circuit (ASIC) or a field programmable gate array (FPGA). Each of the individual units of the system control unit 230 functions as a setting unit that determines an extended trigger region having a predetermined positional relationship with the basic trigger region based on the basic trigger region information, and sets the information defining the determined extended trigger region onto the storage unit 220. The basic trigger region information is information that defines the basic trigger region that triggers an occurrence of an event in an LBE game that presents predetermined content to the player based on the player's position information in the real space. The basic trigger region information can be defined by, for example, a center position of the basic trigger region and a predetermined range (region) based on the center position.

The content information management unit 231 manages AR content of the LBE game, such as three-dimensional objects, layout, and position trigger arrangement.

The position trigger management unit 232 manages a basic trigger region and an extended trigger region that function as position triggers in the LBE game. The basic trigger region is a predetermined region that triggers an occurrence of an event in an application that presents predetermined content to the user based on the user's position information in the real space. The extended trigger region is an extension of the function of the basic trigger region as a position trigger, and is provided as a region that plays a role of a position trigger in place of the basic trigger region when the basic trigger region cannot be used due to a full state. The position trigger management unit 232 manages the arrangement of the position trigger, the use of the position trigger, the reservation information regarding the position trigger, the use status of the extended position trigger, and the like, so as to be appropriate for the progress of the player's game. The position trigger is a region that triggers an occurrence of an event in the LBE game that presents predetermined content to the player based on the player's position information in the real space. The position trigger management unit 232 determines whether the current status is a status in which the position trigger should occur based on the AR content the target player is playing, the context information including the progress of the game of the player, and the position information.

Specifically, the position trigger management unit 232 grasps the progress of the game of other players, and acquires the reservation status of the position trigger of other players. In addition, based on the number of other players playing the LBE game, the progress of the game and position information regarding the other players, the position trigger management unit 232 grasps whether the position trigger requested by the corresponding players is in a full state. For example, the position trigger management unit 232 can determine that a basic trigger region TA is in a full state when there are more players than the preset maximum number of players for the position trigger requested by the players. That is, the position trigger management unit 232 can make the determination based on whether the number of players having the current position within the position trigger defined by the center position of the position trigger and a predetermined range (region) based on the center position is larger than the preset maximum number for the position trigger. When having determined that the position trigger is not in a full state and it is possible to present a normal position trigger based on the information, the position trigger management unit 232 generates a basic trigger region, and presents it to the corresponding player. In contrast, when having determined that the normal position trigger cannot be presented, the position trigger management unit 232 instructs the extended position trigger calculation unit 234 to generate an extended trigger region. The maximum number of people may be set as a fixed number of people set in advance, or may be set as a variable number of people according to the information regarding an application execution environment. Information regarding the application execution environment includes information such as a device environment of the type of device that executes the application (whether the device is an AR-HMD or smartphone, or the like), an application environment according to the type of application (whether it is a game or tourist guide, or the like), geographical environment such as the area and the latitude/longitude of the basic trigger region, and temporal environment such as the date and time of execution of the application.

The player information management unit 233 manages the game progress and position information of the player currently playing the LBE game.

Based on the basic trigger region information defining the basic trigger region, the extended position trigger calculation unit 234 determines an extended trigger region having a predetermined positional relationship with the basic trigger region and sets the information defining the determined extended trigger region onto the storage unit 220.

The player group management unit 235 manages the group to which the player currently playing the LBE game belongs. A group is set for each player participating in the LBE game.

2-3. Basic Trigger Region

Figure 5:
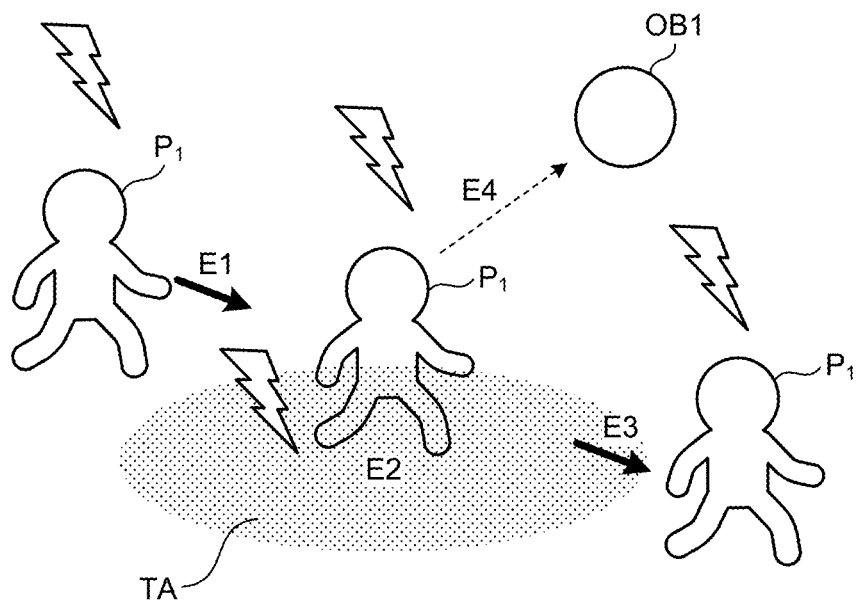
FIG. 5 is a diagram illustrating an outline of a position trigger according to an embodiment.
Figure 6:
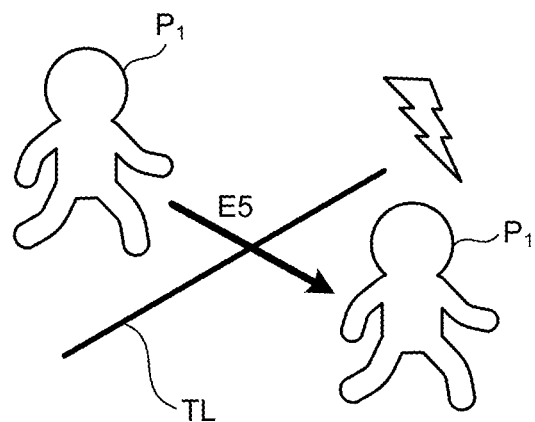
FIG. 6 is a diagram illustrating an outline of a position trigger according to an embodiment.

The position trigger defined in the LBE game according to the embodiment will be described. In LBE games using the AR technology, it is desirable that the player performs no operation of physical devices such as pressing buttons or moving the cursor so that the player can pay attention to the real world. Therefore, the LBE game according to the embodiment defines a position trigger instead of a physical device for a location such as an amusement facility where the LBE game is performed. FIGS. 5 and 6 are diagrams illustrating an outline of the position trigger according to the embodiment.

As illustrated in FIG. 5 or 6, the LBE game according to the embodiment can define a trigger region or a trigger line that functions as a position trigger. By firing a trigger event pre-defined in a position trigger such as a trigger region TA illustrated in FIG. 5 or a trigger line TL illustrated in FIG. 6, a player $P_1$ interacts with the information processing system 1 that controls the LBE game. Examples of trigger events include "Intrusion into a trigger region ($E_1$)", "Notification in a trigger region ($E_2$)", "Exit from a trigger region ($E_3$)", "Viewing an object from a trigger region ($E_4$)", and "passing a trigger line ($E_5$)".

Figure 7:
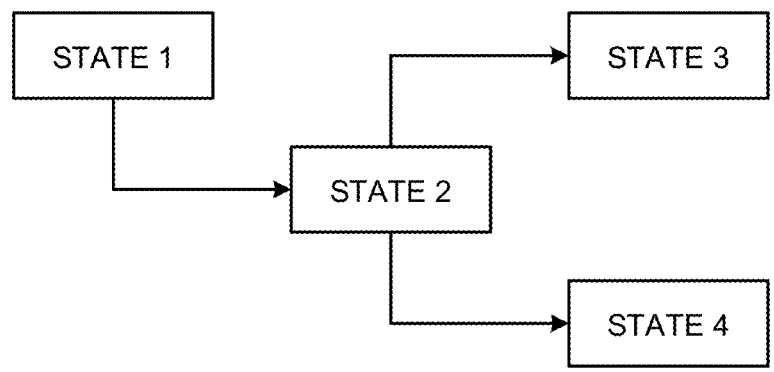
FIG. 7 is a diagram illustrating an example of a state transition according to an embodiment.
Figure 8:
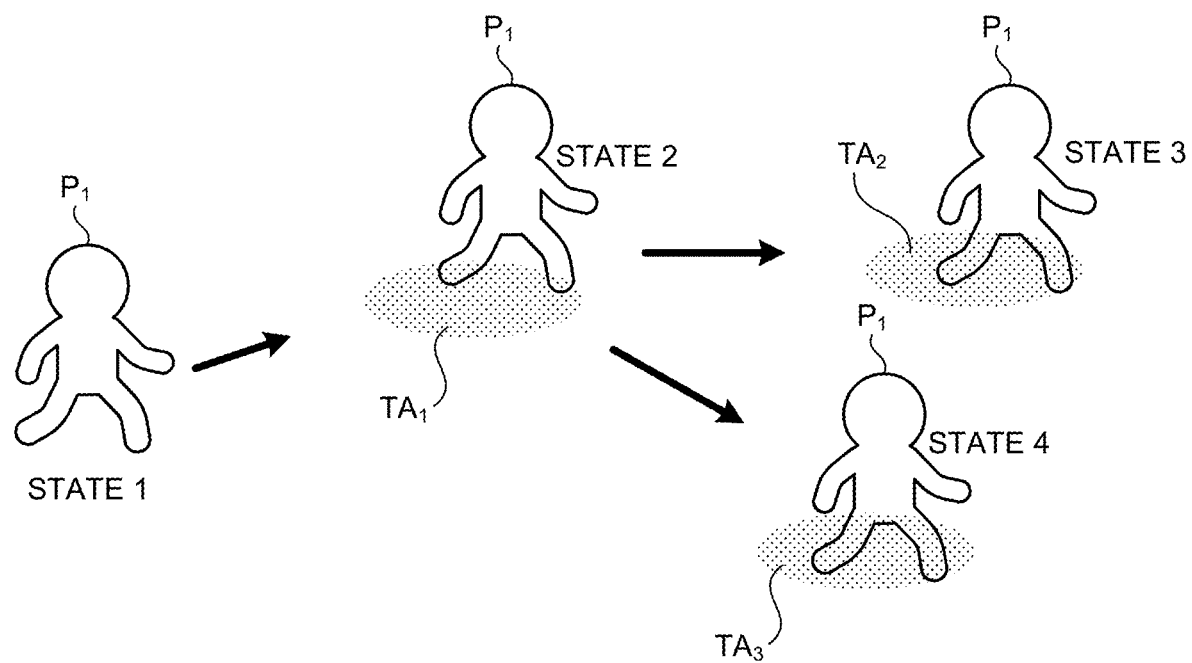
FIG. 8 is a diagram illustrating an example of tax corresponding to each state illustrated in FIG. 7.

The information processing system 1 advances the player's game progress level based on the firing of the trigger event by the player, and moves the game to the next stage. FIG. 7 is a diagram illustrating an example of a state transition according to the embodiment. FIG. 8 is a diagram illustrating an example of tax corresponding to each state illustrated in FIG. 7.

As illustrated in FIG. 7, the information processing system 1 can transition the state of the player by firing a trigger event such as invasion into or passage through the trigger region or the like by the player. As illustrated in FIG. 8, the player $P_1$ can advance the game by executing, for example, a task allocated in advance for each state, for example, a task of selecting the progress of the content of the LBE game.

2-4. Game Progress

In the embodiment of the present disclosure, it is assumed that a plurality of players participates in the LBE game at the same time and that the LBE game is conducted using the real space such as an amusement facility or a park. For this reason, it is operationally difficult for all players to start the game at the same time and end the game at the same time, and players having a plurality of different contexts exist in parallel. In addition, there can be situations where players with a plurality of different contexts exist in the same place. The following are examples of these situations.

Group of persons participating in the same flow as a team such as family or friends.

Players from different groups who happen to be together and start and end the same play at the same time.

Players from different groups who happen to be together, but are playing different orders and scenarios, with the same current task.

Players from different groups who started playing on different courses at different times but happen to perform the same tax in the order of scenario.

In the embodiment of the present disclosure, it is assumed that each player who plays the LBE game has a group to which the player belongs, the same scenario is prepared for each group, and the tax progress is executed. When a plurality of players participates in the LBE game at the same time, as described above, there is a possibility of a situation in which players with different contexts are present in the same place. Therefore, in a case where the same task is to be performed, a collision of a position trigger as a destination can occur, even with different contexts. In addition, some players browse different pieces of content (content included in the LBE game) at the same time in the same space, which hinders the route progress and achievement of immersive feeling. In particular, when there are players participating in a group, it is required to ensure a route and maintain an immersive feeling for each of the players belonging to the group so as not to impair the sense of unity as a group. In view of such a situation, the information processing system according to the embodiment of the present disclosure proposes an extended use of the position trigger.

2-5. Extended Trigger Region

Figure 9:
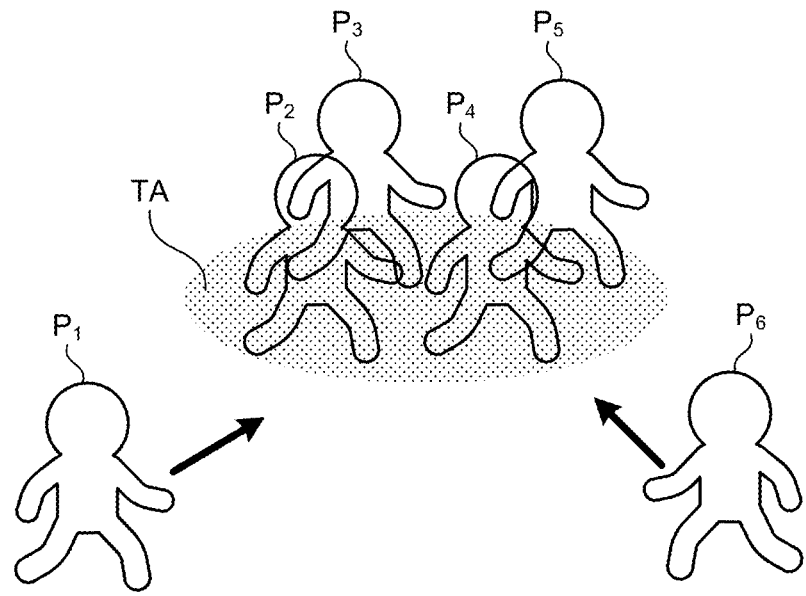
FIG. 9 is a diagram illustrating an example of a situation that can occur in a trigger region according to an embodiment.
Figure 10:
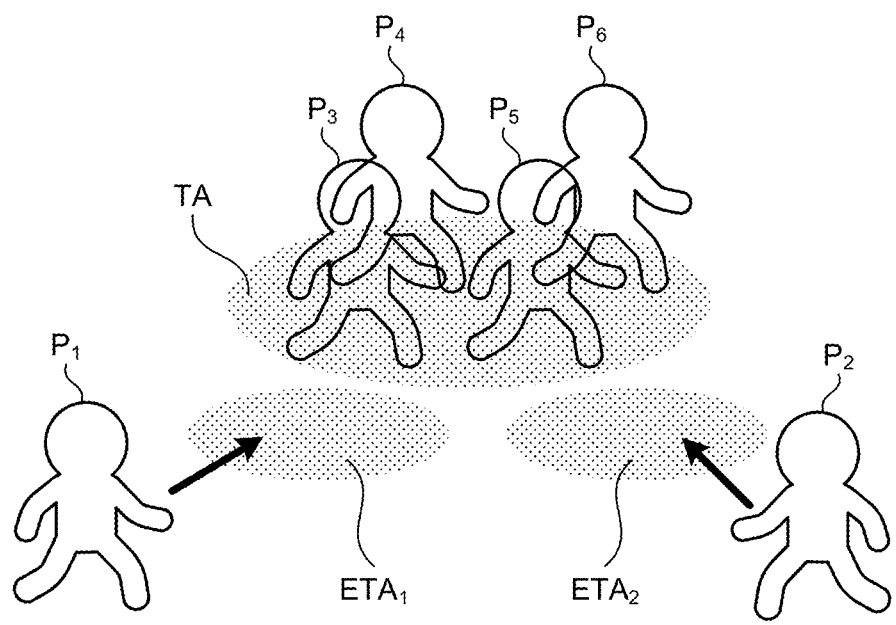
FIG. 10 is a diagram illustrating an outline of an extended trigger region according to an embodiment.

FIG. 9 is a diagram illustrating an example of a situation that can occur in a trigger region according to the embodiment. FIG. 10 is a diagram illustrating an outline of the extended trigger region according to the embodiment.

When a plurality of players having mutually different contexts performs the same task, a collision of a position trigger being a destination occurs between the plurality of players, leading to a full state of the basic trigger region TA as illustrated in FIG. 9. Moreover, there is a possibility that the basic trigger region TA, which is the position trigger, is occupied by a third party or an object unrelated to the game. In such a case, players $P_1$ and $P_2$ cannot enter the basic trigger region TA and cannot advance the game.

To handle this, when having determined that the basic trigger region TA is in a full state, the LBE server 20 determines, as illustrated in FIG. 10, extended trigger regions $ETA_1$ and $ETA_2$ each having a predetermined positional relationship with the basic trigger region TA, based on the basic trigger region information. For example, when there are more players in the basic trigger region TA than the maximum number of players preset for the basic trigger region TA, the LBE server 20 can determine that the basic trigger region TA is in a full state. The players $P_1$ and $P_2$ can advance the game by respectively using the extended trigger regions $ETA_1$ and $ETA_2$ presented by the LBE server 20.

Figure 11:
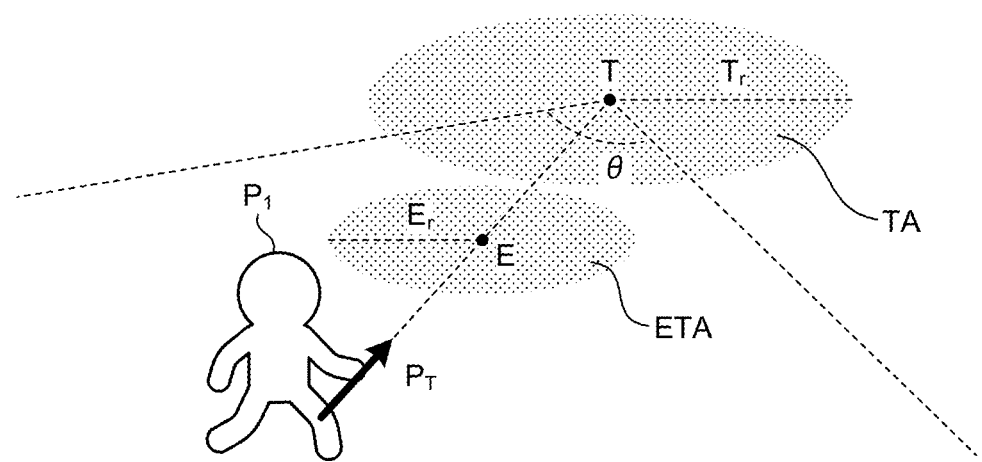
FIG. 11 is a diagram illustrating an example of a method of position calculation and generation of a basic trigger region according to an embodiment.
Figure 12:
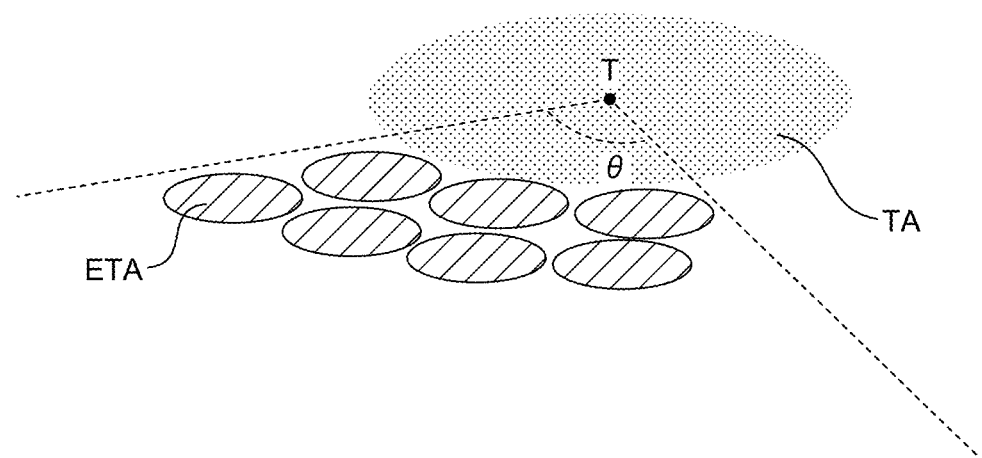
FIG. 12 is a diagram illustrating an example of a method of position calculation and generation of a basic trigger region according to an embodiment.

A method of position calculation and generation of the extended trigger region will be described with reference to FIG. 11. FIGS. 11 and 12 are diagrams each illustrating an example of a method of position calculation and generation of an extended trigger region according to the embodiment. The basic trigger region TA and the extended trigger region ETA are, for example, circular regions each having a center and a predetermined radius, as illustrated in FIG. 11. The basic trigger region TA and the extended trigger region ETA are not particularly limited to the case of circular regions. The basic trigger region TA and the extended trigger region ETA are only required to be a region having a predetermined shape having a center, and may be an elliptical region or a polygonal region such as a square or a hexagon.

Based on the basic trigger region information, the extended position trigger calculation unit 234 of the LBE server 20 determines an extended trigger region having a predetermined positional relationship with the basic trigger region, and sets the information defining the determined extended trigger region onto the storage unit 220. For example, the extended position trigger calculation unit 234 determines the extended trigger region ETA within a predetermined range based on the position of the basic trigger region TA. Specifically, the extended position trigger calculation unit 234 determines the position of the extended trigger region ETA within a range of the region defined by an angle: "θ" illustrated in FIG. 11. For example, by obtaining an angle (V1×V2=ac+bd) formed by a vector V1 (a, b) indicating the orientation of the player and a vector V2 (c, d) connecting the player position and the target position, the extended position trigger calculation unit 234 can calculate the angle: "θ" illustrated in FIG. 11. The target position corresponds to a display position of the content virtually displayed in the space, or a reference point (anchor point) working as a reference or base for displaying the content. The range of the region defined by the angle: "θ" can be determined by physical constraints such as the orientation of the player, the details of scenario of the AR content the player is currently playing, and the building in which the LBE game is played. The details of the scenario of the AR content corresponds to the position of a landmark that is predetermined to be presented to the player from the basic trigger region TA in the game, for example.

Furthermore, the extended position trigger calculation unit 234 calculates a position on a line segment connecting the position of the player and the center of the basic trigger region TA, the position being at a predetermined distance from the center of the basic trigger region TA. Subsequently, the extended position trigger calculation unit 234 determines the calculated position to be defined as the center position of the extended trigger region ETA. The extended position trigger calculation unit 234 defines an extended trigger region having a determined center position and a predetermined range (region) based on the center position, based on the following formula (1). In the following formula (1), "T" indicates the center position of the basic trigger region TA, and "$T_r$" indicates the radius of the basic trigger region TA. Furthermore, in the following formula (1), "E" indicates the center position of the extended trigger region ETA, and "$E_r$" indicates the radius of the extended trigger region ETA. In addition, in the following formula (1), "$P_T$" indicates a unit vector that points from the position of the player to the center of the basic trigger region TA.

$$E=T-(T_r+E_r)P_T \qquad (1)$$

"$T_r$" is preset according to the AR content that the player plays. In addition, "$E_r$" is a region where the safety of one player is ensured, and is assumed to be about 40 centimeters (cm), for example. "$P_T$" is calculated at a time point when it is determined that the extended trigger region is necessary. When the extended trigger region has extended in the height direction, the height of the extended trigger region can be set by using a height obtained by adding something extra height to the player's line of sight, for example. In this case, the LBE server 20 can store information regarding the height of the player's line of sight in advance as player information. The height of the extended trigger region can be appropriately determined, without setting an upper limit, according to the content of the application, for example, determined as the height at infinity.

When generating a plurality of extended trigger regions around the basic trigger region TA, the extended position trigger calculation unit 234 can determine the extended trigger regions ETA so that the extended trigger regions ETA do not overlap each other as illustrated in FIG. 12. For example, by retracting the extended trigger region to be set at a later stage, or varying the angle and the distance, the extended position trigger calculation unit 234 calculates an optimum position where the overlap between the extended trigger regions is cancelled within the range of the region defined by the predetermined angle: "θ".

Figure 13:
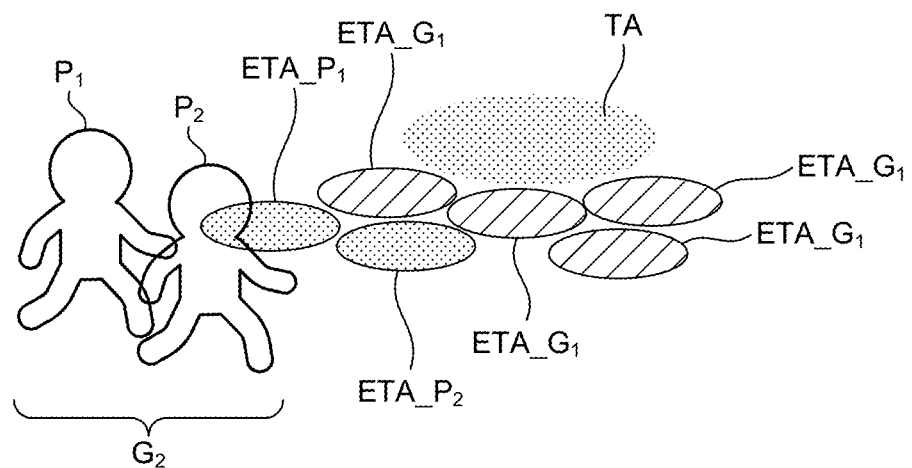
FIG. 13 is a diagram illustrating an example of a method of generating an extended trigger region in consideration of a group according to an embodiment.

The extended position trigger calculation unit 234 specifies a plurality of players belonging to the same group based on the group identification information. The extended position trigger calculation unit 234 can then determine the extended trigger region ETA so that each of the extended trigger regions ETA corresponding to the specified plurality of players is adjacent to the other extended trigger regions ETA. FIG. 13 is a diagram illustrating an example of a method of position calculation and generation of an extended trigger region in consideration of groups according to an embodiment.

As illustrated in FIG. 13, the extended position trigger calculation unit 234 determines the extended trigger region ETA so that the extended trigger regions ETA_$G_1$ and ETA_$G_2$ of the players belonging to the same group are adjacent to each other. The extended trigger region ETA_$G_2$ illustrated in FIG. 13 indicates, for example, the extended trigger region ETA corresponding to each of the players $P_1$ and $P_2$ belonging to a same group: "$G_2$".

Figure 14:
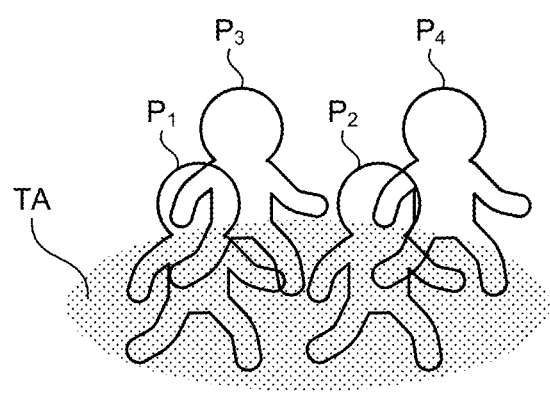
FIG. 14 is a diagram illustrating a condition for determining the necessity of an extended trigger region according to an embodiment.
Figure 15:
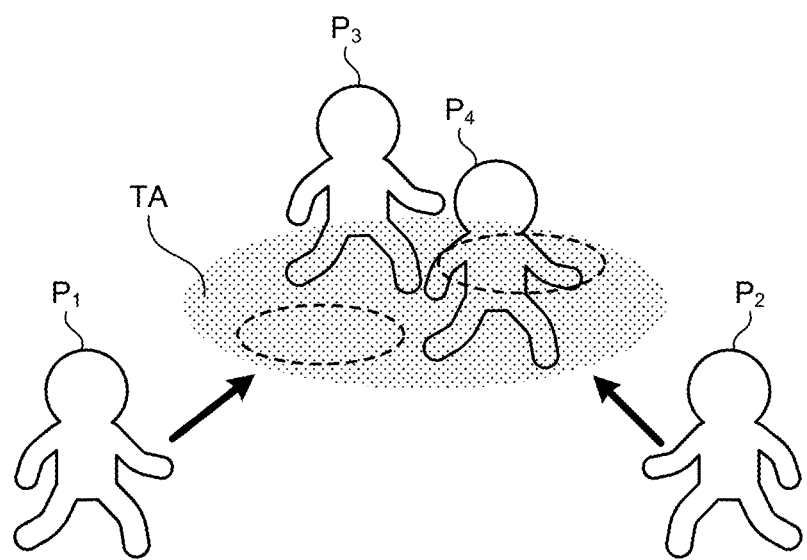
FIG. 15 is a diagram illustrating a condition for determining the necessity of an extended trigger region according to an embodiment.

Next, the conditions for determining whether the extended trigger region is necessary will be described. FIGS. 14 and 15 are diagrams each illustrating a condition for determining the necessity of an extended trigger region according to the embodiment. In the following formula (2), "Ta" indicates the area of the basic trigger region ($T_a=\pi T_r^2$), "k" indicates a constant corresponding to the number of players, and "p" indicates the area of the safety region per player.

$$T_a<kp \qquad (2)$$

When the position trigger management unit 232 has determined that the extended trigger region is necessary based on the condition illustrated in the above formula (2), the extended position trigger calculation unit 234 executes determination of the extended trigger region. That is, the position trigger management unit 232 specifies the basic trigger region TA to be the next destination of the corresponding player based on the context information including the progress of the game of the corresponding player as a processing target, the position information, and the like. Subsequently, the position trigger management unit 232 predicts the number of players present in the basic trigger region TA based on the context information including the progress of the game of other players, the position information, and the like, before the corresponding player arrives at the basic trigger region being the next destination. Subsequently, as illustrated in FIG. 14, when having predicted that there are more players than the preset maximum number in the basic trigger region to be the next destination for the player, the position trigger management unit 232 determines that the extended trigger region is necessary. Furthermore, based on the progress of the game, the position information, and the like regarding all the players, the position trigger management unit 232 predicts whether there is a possibility of an occurrence of a situation in which the number of players whose destination is the same basic trigger region is larger than the maximum number of players preset in the basic trigger region. As illustrated in FIG. 15, when it is predicted that the number of players whose destination is the same basic trigger region TA will be larger than the maximum number for the basic trigger region TA, the position trigger management unit 232 may determine that the extended trigger region will be necessary. The determination of whether there are more players than the preset maximum number of players in the basic trigger region is executed following the condition illustrated in the above formula (2).

Figure 16:
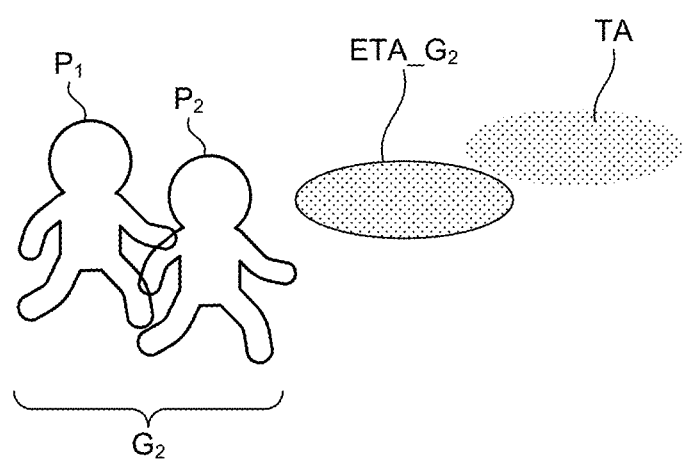
FIG. 16 is a diagram illustrating a modification of the method of position calculation and generation of an extended trigger region according to an embodiment.
Figure 17:
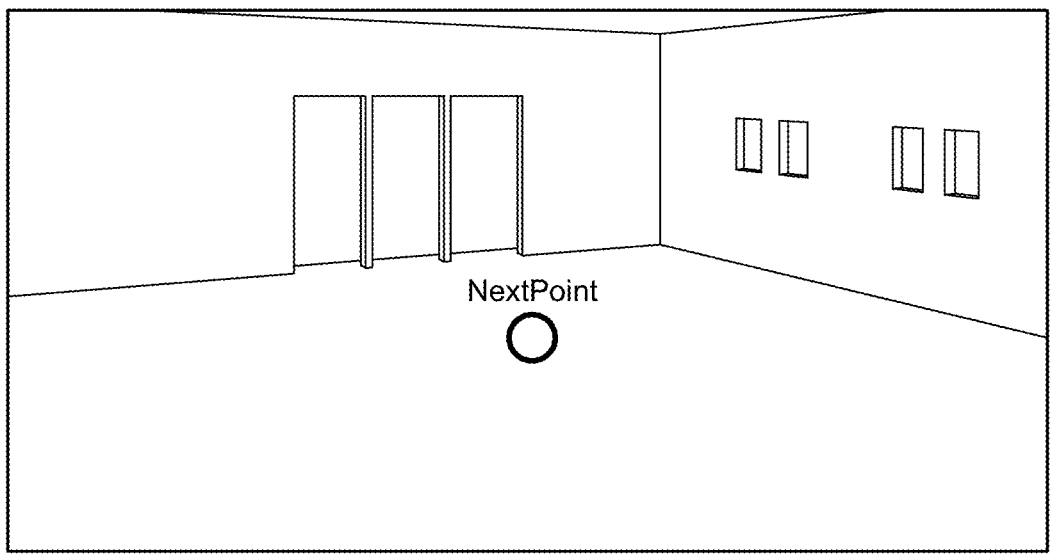
FIG. 17 is a diagram illustrating an example of representation of a trigger region according to an embodiment.
Figure 18:
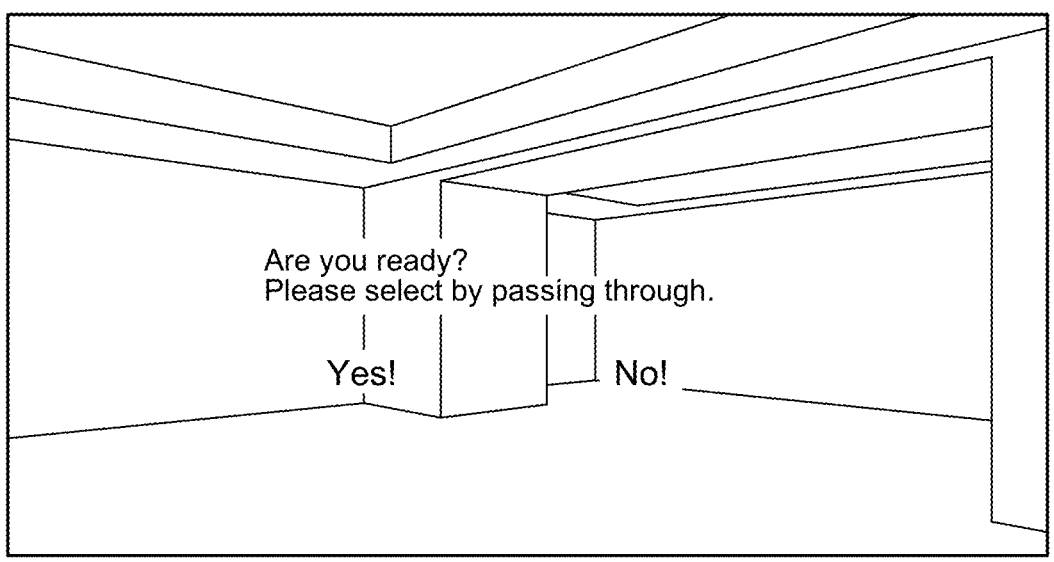
FIG. 18 is a diagram illustrating an example of representation of a trigger region according to an embodiment.
Figure 19:
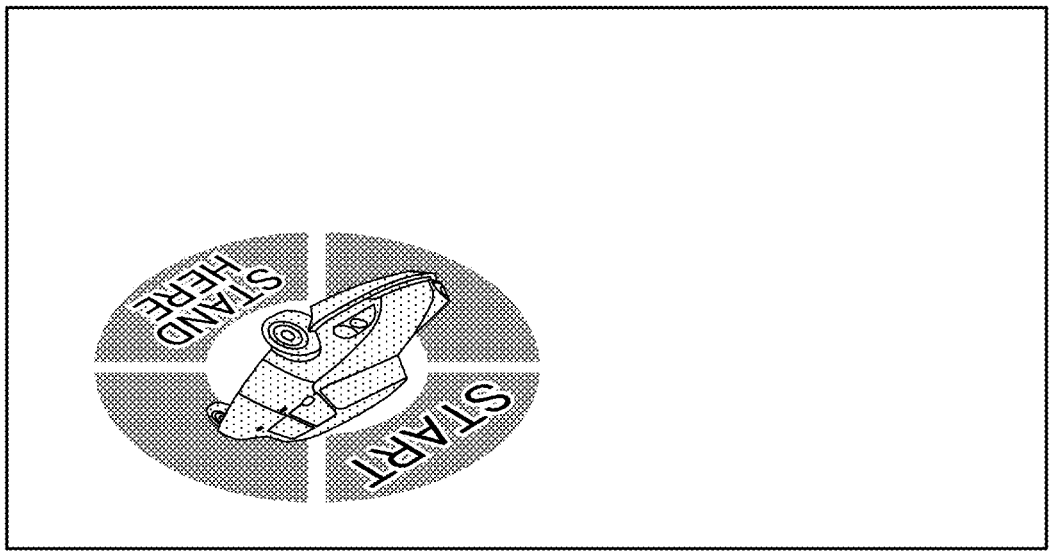
FIG. 19 is a diagram illustrating an example of representation of a trigger region according to an embodiment.

A modification of the method of position calculation and generation of the extended trigger region will be described with reference to FIG. 16. FIG. 16 is a diagram illustrating a modification of the method of position calculation and generation of an extended trigger region according to an embodiment. The extended position trigger calculation unit 234 is not particularly limited to an example of individually determining the extended trigger region corresponding to each of the players belonging to the same group. As illustrated in FIG. 16, the extended position trigger calculation unit 234 may determine, around the basic trigger region TA, one extended trigger region $ETA\_G_2$ having a region simultaneously usable by players $P_1$ and $P_2$ belonging to the same group: "$G_2$".

<Representation of Trigger Region>

Next, representation of the trigger region will be described. FIGS. 17 to 20 are diagrams illustrating an example of representation of the trigger region according to the embodiment. FIG. 21 is a diagram illustrating an outline of representation of the extended trigger region according to the embodiment.

In the information processing system 1, the program that provides the function of the LBE game can control the display of an object of Augmented Reality (AR) that superimposes additional information on the real space and augments the real environment perceived by humans. For example, the basic trigger region and the extended trigger region are provided to the player by using an object that is virtually displayed in space or an object that is projected to a floor surface. For example, as illustrated in FIGS. 17 to 20, the basic trigger region presented from the information processing system 1 to the LBE terminal 10 is represented by a point with a text projected into the air, text with a message (passage of text), an image projected to the floor surface, a virtual solid projected into the air, and the like.

Figure 20:
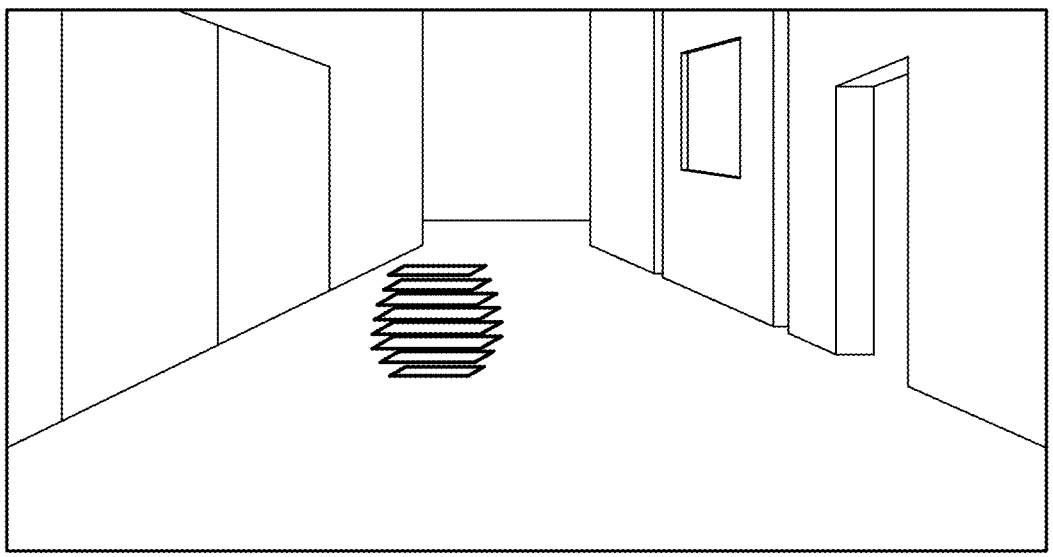
FIG. 20 is a diagram illustrating an example of representation of a trigger region according to an embodiment.
Figure 21:
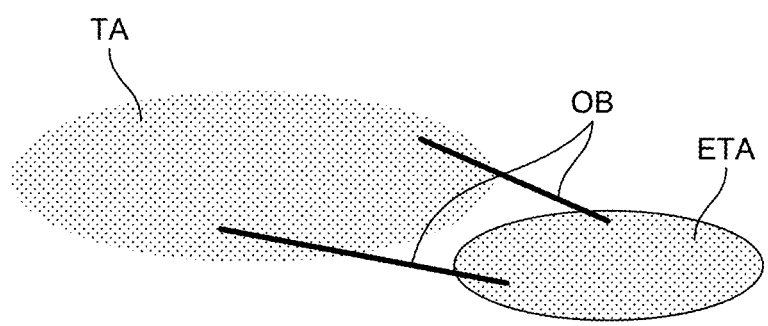
FIG. 21 is a diagram illustrating an outline of representation of an extended trigger region according to an embodiment.

Furthermore, as illustrated in FIG. 20, when both the basic trigger region TA and the extended trigger region ETA are presented to the player, it is allowable to display an object OB or the like indicating the relationship between the basic trigger region TA and the extended trigger region ETA. The object OB may be represented in any manner as long as it allows the player to recognize that the basic trigger region TA and the extended trigger region ETA have the same function.

3. Processing Procedure Examples

3-1. Control on LBE Server Side

Figure 22:
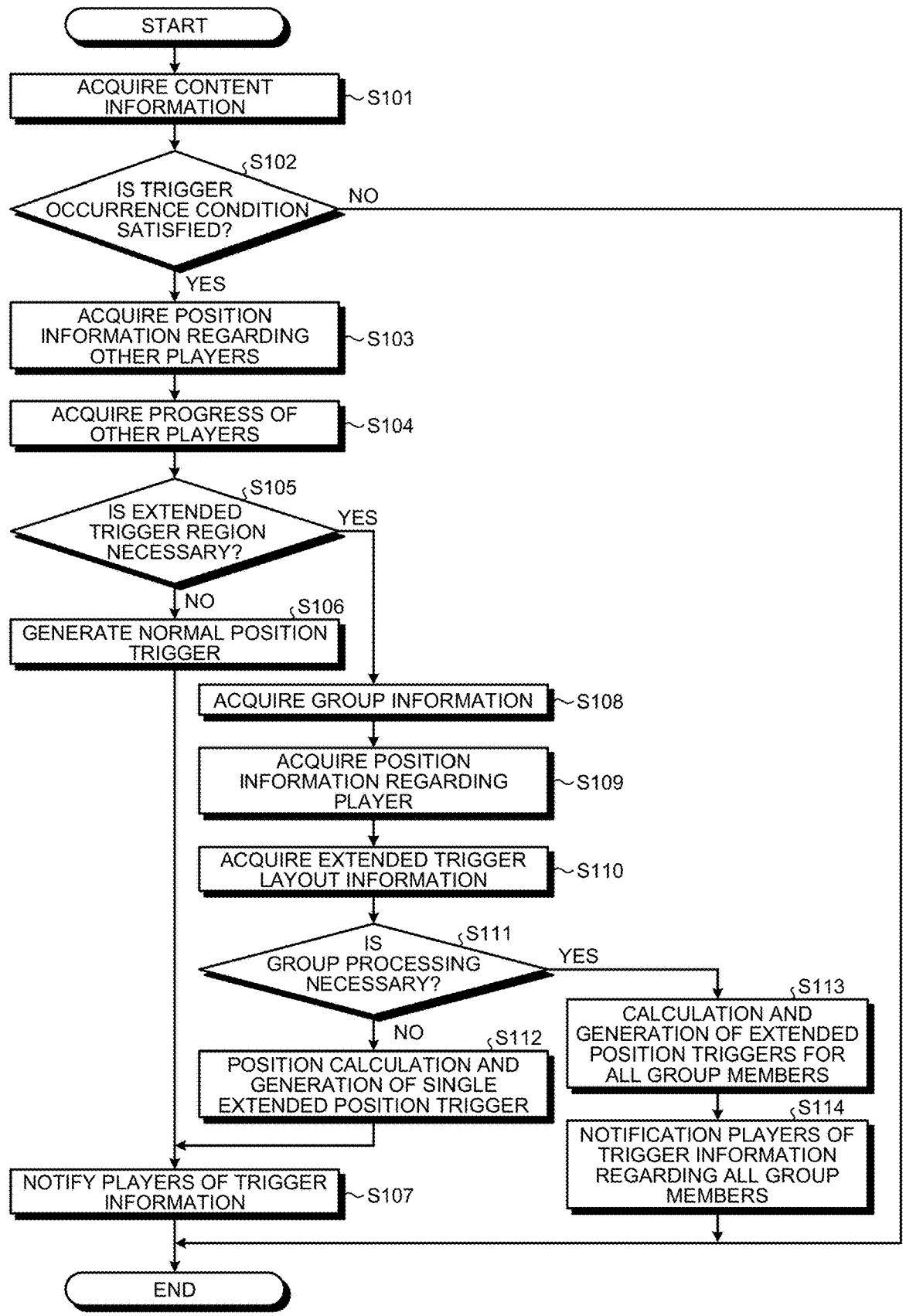
FIG. 22 is a flowchart illustrating an example of processing of an LBE server according to an embodiment.

An example of processing by the LBE server 20 according to the embodiment will be described with reference to FIG. 22. FIG. 22 is a flowchart illustrating an example of processing of the LBE server according to the embodiment.

As illustrated in FIG. 22, the position trigger management unit 232 acquires content information regarding the LBE game (step S101), grasps content to be displayed as AR content, environment information, progress of the player as a processing target, and the like.

Next, based on a scenario of the AR content and the progress of the player as a processing target, the position trigger management unit 232 determines whether the current status is a status in which the position trigger should occur, that is, whether the trigger occurrence condition is satisfied (step S102). The progress of the player as a processing target includes the player's context.

When the position trigger management unit 232 determines that the trigger occurrence condition is not satisfied (step S102; No), the position trigger management unit 232 ends the process illustrated in FIG. 22.

When having determined that the trigger occurrence condition is satisfied (step S102; Yes), the position trigger management unit 232 acquires position information regarding other related players in the same space currently playing the LBE game (step S103).

With reference to the information managed by the player information management unit 233, the position trigger management unit 232 acquires the progress of the LBE game of other related players currently playing the LBE game in the same space (step S104). The position trigger management unit 232 also grasps the reservation status of the basic trigger region as the progress of the other players.

The position trigger management unit 232 determines whether the extended trigger region is necessary based on the progress of the player as a processing target as well as the position information and the progress of the other players (step S105). For example, based on the context information including the progress of the game of the corresponding player as a processing target, the position information, and the like, the position trigger management unit 232 specifies the basic trigger region to be the next destination of the corresponding player. Subsequently, the position trigger management unit 232 predicts the number of players present in the basic trigger region based on the context information including the progress of the game of other players, the position information, and the like, before the corresponding player arrives at the basic trigger region being the next destination. When having predicted that there are more players than the preset maximum number in the basic trigger region to be the next destination for the player, the position trigger management unit 232 determines that the extended trigger region will be necessary. Furthermore, based on the progress of the game, the position information, and the like regarding all the players, the position trigger management unit 232 predicts whether there is a possibility of an occurrence of a situation in which the number of players whose destination is the same basic trigger region is larger than the maximum number of players preset in the basic trigger region. When it is predicted that the number of players whose destination is the same basic trigger region will be larger than the maximum number for the basic trigger region, the position trigger management unit 232 may determine that the extended trigger region will be necessary.

When having determined that the extended trigger region is not required (step S105; No), the position trigger management unit 232 generates a normal position trigger, that is, a basic trigger region prepared in the AR content (step S106).

The position trigger management unit 232 notifies the player as a processing target of the trigger information regarding the generated basic trigger region (step S107), and ends the process illustrated in FIG. 22.

When the position trigger management unit 232 has determined in step S105 that the extended trigger region is necessary (step S105; Yes), the position trigger management unit 232 acquires group information from the player group management unit 235 (step S108). The position trigger management unit 232 acquires, as the group information, the member information of the group to which the player as a processing target belongs, the member's position information, and the context of the member.

Subsequently, the position trigger management unit 232 acquires the position information regarding the player as a processing target from the player information management unit 233 (step S109).

Subsequently, the position trigger management unit 232 acquires extended trigger layout information (step S110). The extended trigger layout information includes attributes of the extended trigger region and a layout rule of the extended trigger region. The attributes of the extended trigger region include information regarding the size and shape of the extended trigger region. The layout rule is a rule used at arranging the extended trigger region around the basic trigger region, and is defined by the above formula (1) or the like.

Subsequently, the position trigger management unit 232 determines whether group processing is necessary (step S111). The position trigger management unit 232 determines whether group processing needs to be performed based on the content information acquired in step S101, the group information acquired in step S108, and the extended trigger layout information acquired in step S110.

When the position trigger management unit 232 has determined that the group processing is not to be executed (step S111; No), the extended position trigger calculation unit 234 executes the position calculation and generation of a single extended trigger region (step S112), and moves on to the processing procedure of the above-described step S107. The position calculation and generation of the extended trigger region is executed by the method illustrated in FIGS. 11 and 12 based on the position information of the player as a processing target, information regarding a display target as AR content included in the content information and the environment information, and the progress (reservation status) of other players. The position information regarding the player as a processing target is acquired in above-described step S107, the information to be displayed as AR content included in the content information and the environment information are acquired in above-described step S101, and the progress (reservation status) of other players is acquired in above-described step S103.

In contrast, when the position trigger management unit 232 has determined that the group processing is to be executed (step S111; Yes), the extended position trigger calculation unit 234 executes the position calculation and generation of the extended trigger region for all the groups (step S113). The position calculation and generation of the extended trigger region for all the groups in step S113 are executed by the method illustrated in FIGS. 11 to 13 and the like. The position trigger management unit 232 notifies all the group members of the information regarding the extended trigger region generated by the extended position trigger calculation unit 234 (step S114), and ends the process illustrated in FIG. 22.

3-2. Control on LBE Terminal Side

Figure 23:
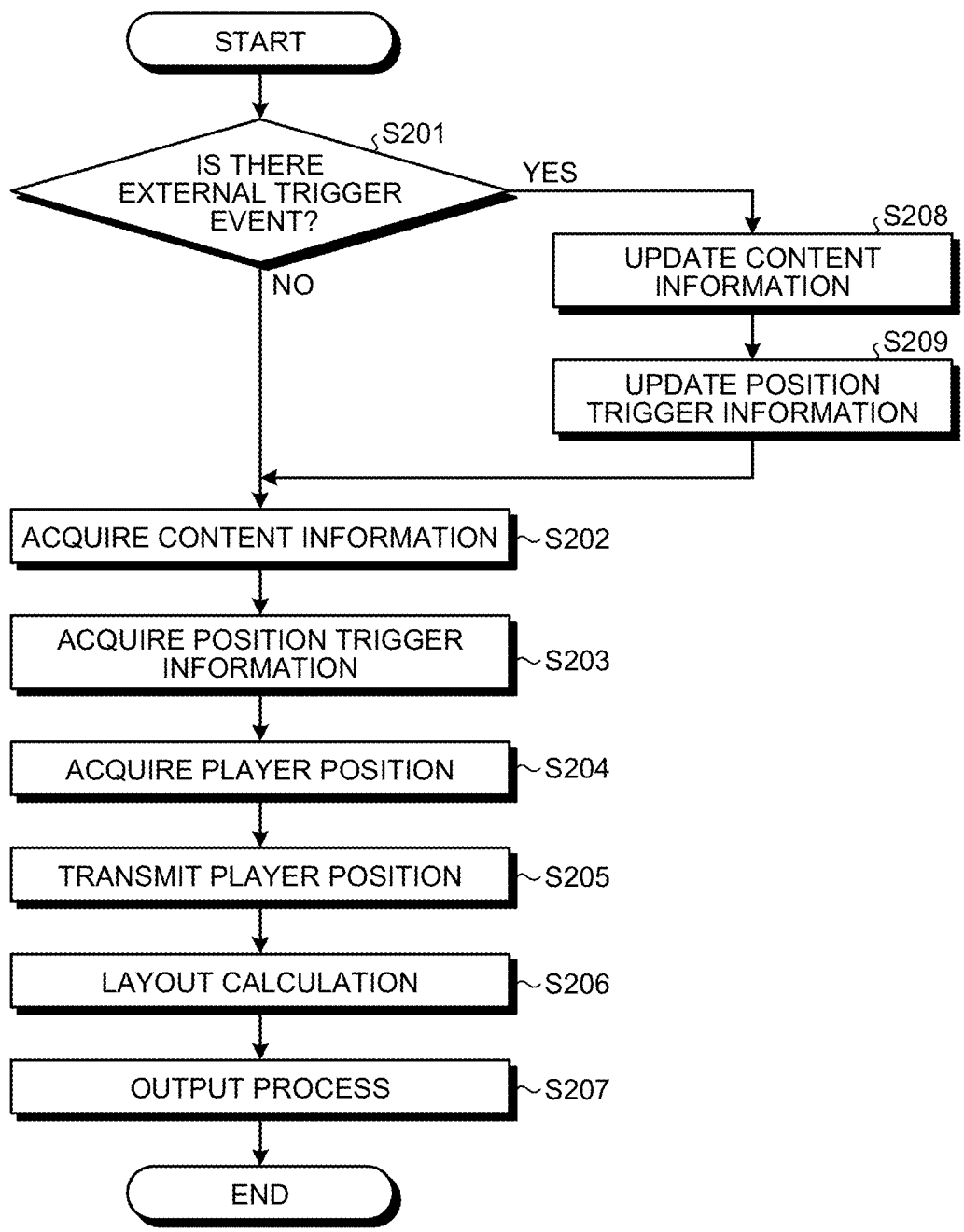
FIG. 23 is a flowchart illustrating an example of processing of an LBE terminal according to an embodiment.

An example of processing by the LBE terminal 10 according to the embodiment will be described with reference to FIG. 23. FIG. 23 is a flowchart illustrating an example of processing of an LBE terminal according to the embodiment.

As illustrated in FIG. 23, the position trigger determination unit 183 determines whether an external trigger event related to the progress of the LBE game has been received from the LBE server 20 (step S201).

When having determined that the external trigger event has not been acquired (step S201; No), the position trigger determination unit 183 acquires content information of the LBE game from the storage unit 170 (step S202). The position trigger determination unit 183 develops, from the content information, a three-dimensional object and layout information to be the basis of the three-dimensional display.

The position trigger determination unit 183 acquires the position trigger information from the LBE server 20 (step S203). The position trigger determination unit 183 acquires the position of the position trigger that is valid for the current player.

The position trigger determination unit 183 acquires the player's position based on the information acquired by the physical information acquisition unit 181 (step S204).

The position trigger determination unit 183 transmits the position information regarding the player to the LBE server 20 based on the information acquired by the physical information acquisition unit 181 (step S205).

The layout parameter calculation unit 182 calculates the layout necessary for the three-dimensional display based on the content information, the current player position, and the position of the position trigger that is valid for the current player (step S206).

The output control unit 184 executes an output process of superimposing and displaying virtual three-dimensional display information on the real space expanding in the player's field of view (step S207), and ends the process illustrated in FIG. 23.

In step S201, when having determined that the external trigger event has been acquired (step S201; Yes), the position trigger determination unit 183 updates the content information stored in the storage unit 170 (step S208). The position trigger determination unit 183 acquires the next content information from the LBE server 20.

Subsequently, the position trigger determination unit 183 updates the position trigger information stored in the storage unit 170 (step S209), and ends the process illustrated in FIG. 23. The position trigger determination unit 183 acquires the next position trigger information from the LBE server 20.

4. Modification of Extended Trigger Region 4-1. Reservation of Extended Trigger Region The position trigger management unit 232 may preset, onto the storage unit 220, information defining a region for allocating an extended trigger region corresponding to a plurality of players belonging to the same group. This makes it possible to perform advance acquisition of a region for allocating the extended trigger regions corresponding to the plurality of players belonging to the same group. When it is predicted that more users than the maximum number of users of the basic trigger region are present in the basic trigger region based on context information including the progress of the player's game and the position information, the position trigger management unit 232 performs advance acquisition of a region to be used for the extended trigger region. Specifically, based on the progress of the game, the position information, and the like regarding all the players, the position trigger management unit 232 predicts whether there can be a situation in which the number of players having a same basic trigger region as a destination is larger than the maximum number preset for the basic trigger region. When having determined that such a situation can occur, the position trigger management unit 232 preset, onto the storage unit 220, information defining a region for allocating an extended trigger region corresponding to a plurality of players belonging to the same group.

Figure 24:
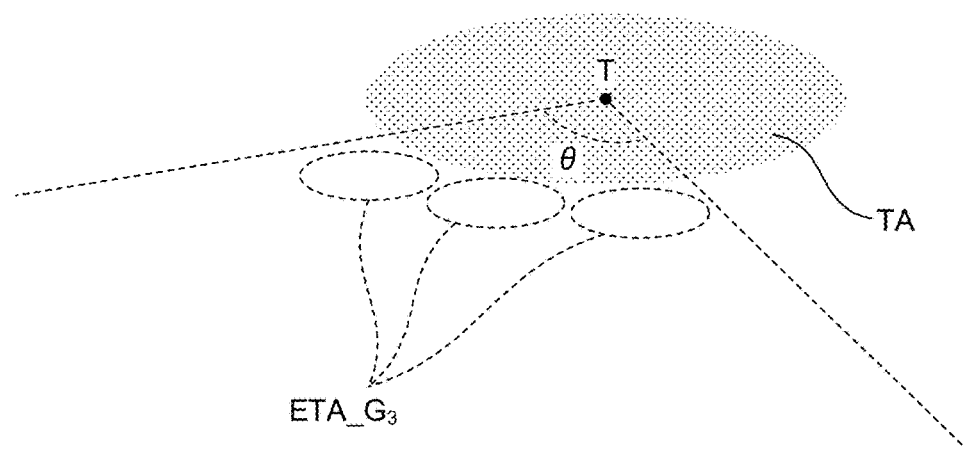
FIG. 24 is a diagram illustrating an outline of reservation of an extended trigger region according to a modification.

FIG. 24 is a diagram illustrating an outline of reservation of an extended trigger region according to the modification. As illustrated in FIG. 24, here is an assumable case where the position trigger management unit 232 predicts that the basic trigger region TA will be full based on the progress of the game, the position information, and the like regarding all the players. Additionally, the next destination of each player belonging to the same group G3 (for example, ID: g001) is assumed to be the basic trigger region TA. In this case, the position trigger management unit 232 sets, onto the storage unit 220, information (for example, areas E100, E101, and E102) defining a region for allocating an extended trigger region ETA_$G_3$ of individual players belonging to the same group G3. The information defining the region for allocating the extended trigger region ETA_$G_3$ is defined by, for example, information indicating the center position of the region and information indicating a predetermined range (region) based on the center position. The information indicating the center position may be defined by information related to latitude, longitude, altitude, positioning error, as well as coordinates of the X-axis, Y-axis, and Z-axis having a specific geographical position as the origin, and the like. The information indicating a predetermined range (region) may be defined by a predetermined distance from the center position. This makes it possible, for the position trigger management unit 232, to perform advance acquisition of a region for allocating the extended trigger region corresponding to the plurality of players belonging to the same group. For example, when an extended trigger region is to be necessary for any player in the group, the position trigger management unit 232 ensures regions for allocating the extended trigger region to other players belonging to the same group. This makes it possible to ensure the extended trigger regions adjacent to each other between the players in the group, and possible to maintain the distance between the players belonging to the same group.

Note that, even when the player is alone, the position trigger management unit 232 can also perform advance acquisition of a region for allocating an extended trigger region, similarly to the case of the players belonging to the group.

4-2. Guiding-Type Extended Trigger Region

The position trigger management unit 232 may determine an extended trigger region corresponding to the player on a route along which each player playing the LBE game is expected to move when heading for the basic trigger region.

Figure 25:
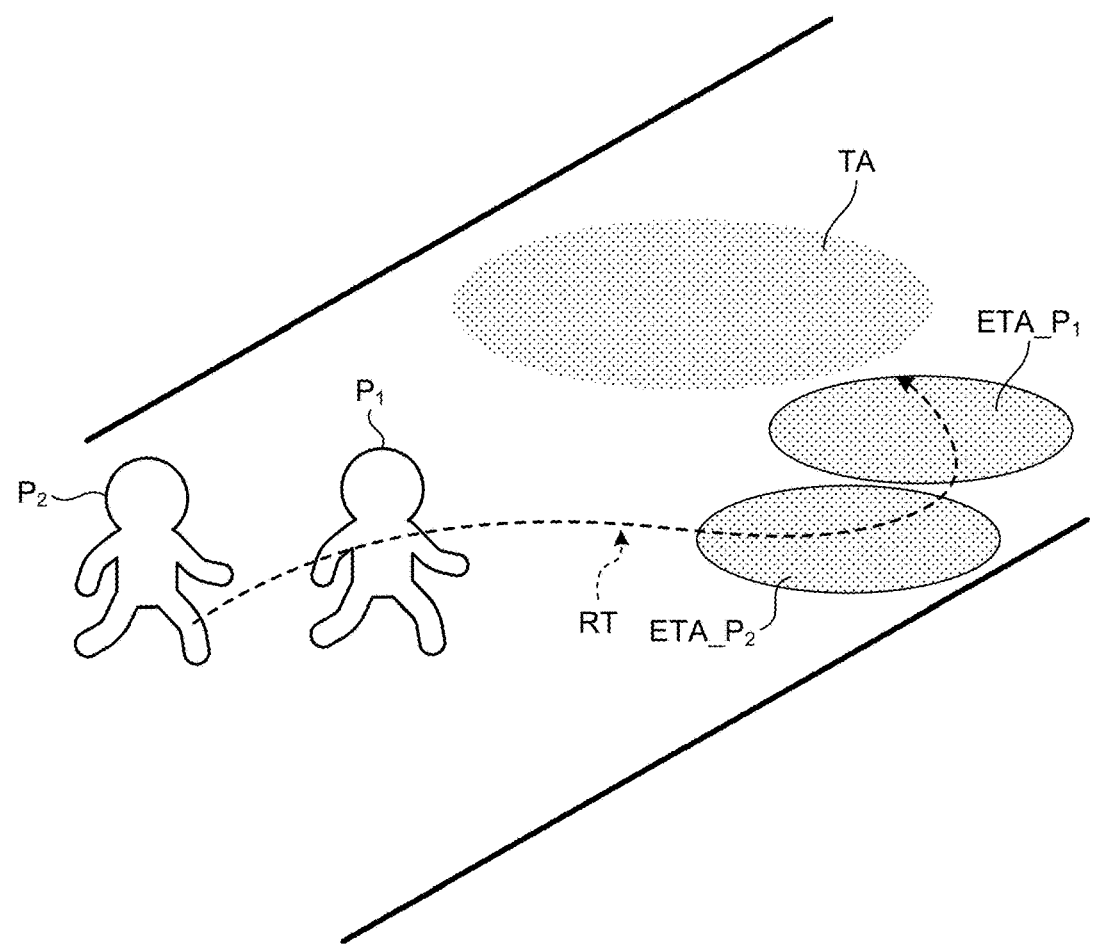
FIG. 25 is a diagram illustrating an outline of a guiding-type extended trigger region according to a modification.

FIG. 25 is a diagram illustrating an outline of a guiding-type extended trigger region according to the modification. The position trigger management unit 232 predicts a route RT along which a player $P_1$ and a player $P_2$ are expected to move when heading for the basic trigger region TA. Subsequently, the position trigger management unit 232 sets an extended trigger region ETA_$P_1$ for the player $P_1$ and an extended trigger region ETA_$P_2$ for the player $P_2$ on the predicted route RT, individually. The position trigger management unit 232 is capable of not only determining the extended trigger region at the shortest distance from the basic trigger region TA, but also determining an extended trigger region at a position that is not necessarily the shortest distance from the basic trigger region TA, such as the extended trigger region ETA_$P_2$ illustrated in FIG. 25. This makes it possible to guide the player using the position trigger in accordance with restrictions in the real environment, such as a narrow passage or the flow of people in the real space.

4-3. Group Guiding-Type Extended Trigger Region

The position trigger management unit 232 may determine the guiding-type extended trigger region on a group-by-group basis. The position trigger management unit 232 may determine an extended trigger region on a route along which a plurality of players belonging to the same group is expected to move when heading for the basic trigger region, based on the group identification information and the context information. The position trigger management unit 232 determines each of the extended trigger regions corresponding to the plurality of players belonging to each group on the expected route.

Figure 26:
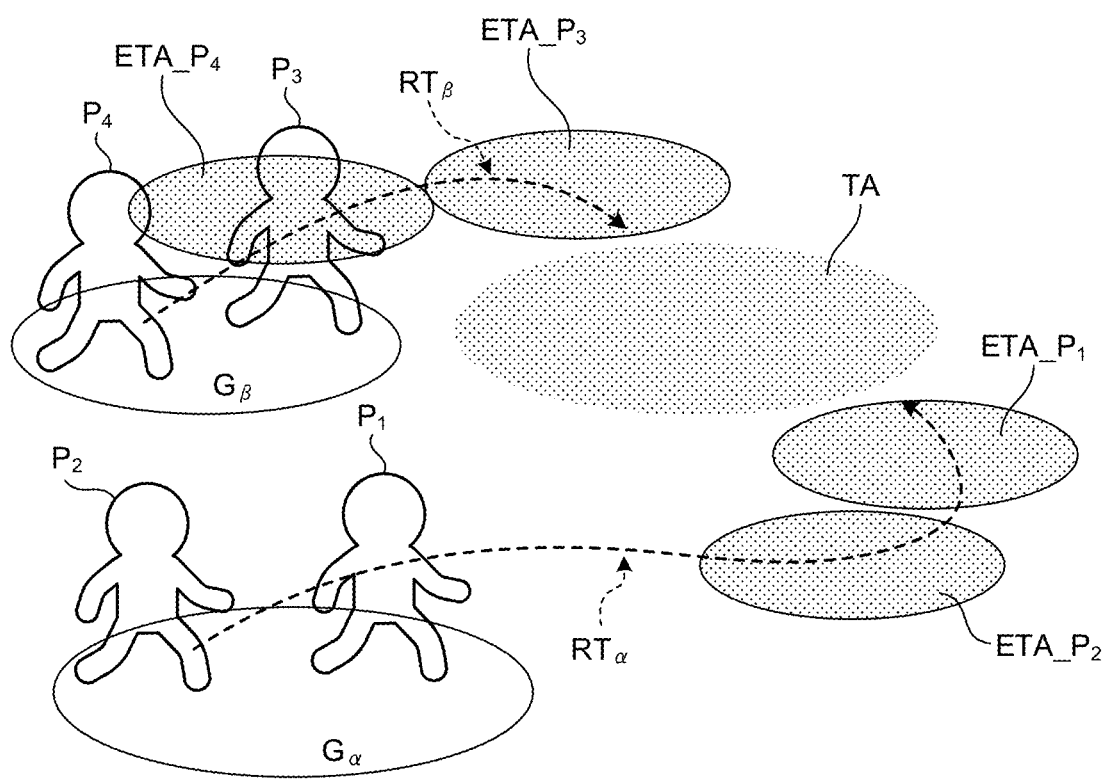
FIG. 26 is a diagram illustrating an outline of a group guiding-type extended trigger region according to a modification.

FIG. 26 is a diagram illustrating an outline of the group guiding-type extended trigger region according to the modification. The position trigger management unit 232 predicts a route RTα along which players $P_1$ and $P_2$ belonging to a group α are expected to move when heading for the basic trigger region TA. The position trigger management unit 232 then determines the extended trigger region ETA_$P_1$ for the player $P_1$ and the extended trigger region ETA_$P_2$ for the player $P_2$ on the predicted route RTα, individually. The position trigger management unit 232 predicts a route RTβ along which players $P_3$ and $P_4$ belonging to a group β are expected to move when heading for the basic trigger region TA. The position trigger management unit 232 then determines an extended trigger region ETA_$P_3$ for the player $P_3$ and an extended trigger region ETA_$P_4$ for the player $P_4$ on the predicted route RTβ, individually. Note that the determination is to be made on a group-by-group basis; for example, when determining an extended trigger region corresponding to a certain player in the group, an extended trigger region is to be also determined for other players belonging to the same group.

In this manner, by using the position trigger, it is possible to guide the players on a group-by-group basis while maintaining a short distance between the players belonging to the group. In addition, it is possible to provide LBE game content such as three-dimensional objects without being disturbed by other groups.

4-4. Afterglow of Event in Extended Trigger Region

Figure 27:
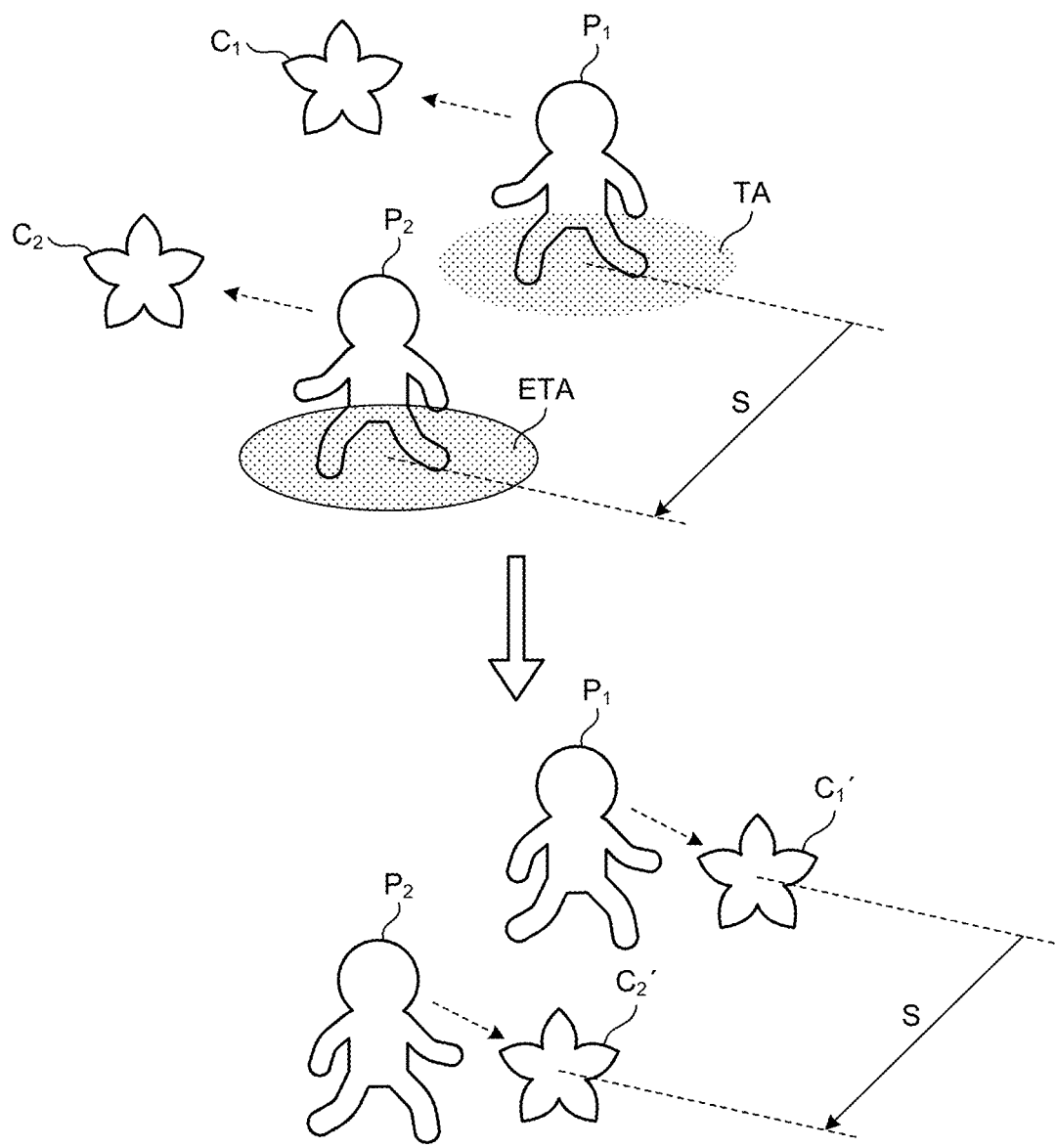
FIG. 27 is a diagram illustrating an outline of afterglow of an event in an extended trigger region according to a modification.

When a trigger event is fired in an extended trigger region, the player might experience the trigger in a state where a specific world concept of the AR content deviates from the original assumption. This can impair the immersive feeling into the LBE game. Therefore, the amount of deviation of the extended trigger region from the basic trigger region may be reflected in the content as much as allowed thereafter. FIG. 27 is a diagram illustrating an outline of afterglow of an event in an extended trigger region according to the modification.

As illustrated in FIG. 27, the player $P_2$ can advance the event of the LBE game by using an extended trigger region ETA determined at a position shifted by a deviation amount "S" from the basic trigger region TA.

Here, it is assumed that the LBE game scenario is provided with an attribute that the position dependence of the position trigger is important, for example, together with the progress of the LBE game. In this case, the position trigger management unit 232 presents content $C_2'$ referenced by the player $P_2$ at a position shifted from content $C_1'$ referenced by the player $P_2$ from the basic trigger region TA by the deviation amount "S" together with the progress of the game. Furthermore, when the player is playing the LBE game on a group-by-group basis, this deviation amount "S" may be shared between the groups. Specifically, an average displacement amount of the extended trigger region in the group is assumed as the deviation amount "S". This allows the players in the group to view the content in the same position.

In the above embodiment, the LBE game is not limited to AR content using AR technology, and may be VR content in which real space and virtual reality are mixed.

5. Hardware Configuration

Figure 28:
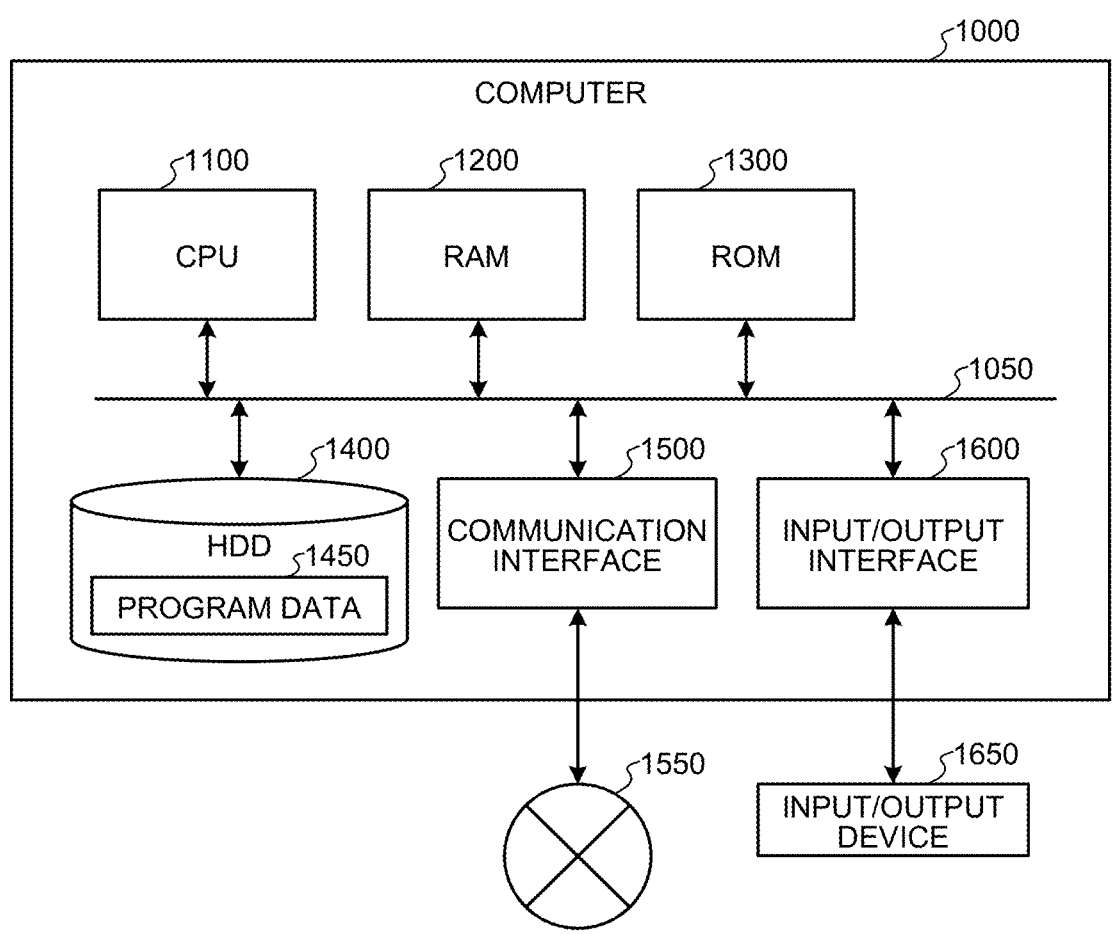
FIG. 28 is a hardware configuration diagram illustrating an example of a computer that actualizes functions of an information processing apparatus according to an embodiment.

The information processing apparatus such as the LBE server 20 according to the above embodiment is actualized by a computer 1000 having a configuration as illustrated in FIG. 28, for example. Hereinafter, the LBE server 20 according to the embodiment will be described as an example. FIG. 28 is a hardware configuration diagram illustrating an example of a computer that actualizes functions of an information processing apparatus according to the embodiment.

The computer 1000 illustrated in FIG. 28 includes a CPU 1100, RAM 1200, read only memory (ROM) 1300, a hard disk drive (HDD) 1400, a communication interface 1500, and an input/output interface 1600. Individual components of the computer 1000 are interconnected by a bus 1050.

The CPU 1100 operates based on a program stored in the ROM 1300 or the HDD 1400 so as to control each of components. For example, the CPU 1100 develops the program stored in the ROM 1300 or the HDD 1400 into the RAM 1200 and executes processes corresponding to various programs.

The ROM 1300 stores a boot program such as a basic input output system (BIOS) executed by the CPU 1100 when the computer 1000 starts up, a program dependent on hardware of the computer 1000, or the like.

The HDD 1400 is a non-transitory recording medium that records a program executed by the CPU 1100, data used by the program, and the like, and is readable by the computer 1000. Specifically, the HDD 1400 is a recording medium that records a program for actualizing processing functions by individual unit of the system control unit 230 illustrated in FIG. 3, for example.

The communication interface 1500 is an interface for connecting the computer 1000 to an external network 1550 (for example, the Internet). For example, the CPU 1100 receives data from other devices or transmits data generated by the CPU 1100 to other devices via the communication interface 1500.

The input/output interface 1600 is an interface for connecting between an input/output device 1650 and the computer 1000. For example, the CPU 1100 receives data from an input device such as a keyboard or a mouse via the input/output interface 1600. In addition, the CPU 1100 transmits data to an output device such as a display, a speaker, or a printer via the input/output interface 1600. Furthermore, the input/output interface 1600 may function as a media interface for reading a program or the like recorded on predetermined recording medium (or simply medium). Examples of the media include optical recording media such as a digital versatile disc (DVD) or a phase change rewritable disk (PD), a magneto-optical recording medium such as a magneto-optical disk (MO), a tape medium, a magnetic recording medium, and semiconductor memory.

For example, when the computer 1000 functions as the LBE server 20 according to the embodiment, the CPU 1100 of the computer 1000 executes a program loaded on the RAM 1200 (such as a program for actualizing various processes by the LBE server 30). This actualizes functions such as various processes executed by the system control unit 230 of the LBE server 20. Furthermore, the HDD 1400 stores a program for actualizing various processes by the system control unit 230 of the LBE server 20 according to the present disclosure, data stored in the storage unit 220 of the LBE server 20, and the like. While the CPU 1100 executes program data 1450 read from the HDD 1400, the CPU 1100 may acquire these programs from another device via the external network 1550, as another example.

10. CONCLUSION

As described above, according to one embodiment of the present disclosure, the information processing apparatus according to the present disclosure (LBE server 20 as an example) includes a setting unit (an example of this is the system control unit 230) that determines an extended trigger region having a predetermined positional relationship with a basic trigger region based on basic trigger region information and that sets information defining the determined extended trigger region onto the storage unit. The basic trigger region information is information defining the basic trigger region that triggers an occurrence of an event in an application that presents predetermined content to the user based on the position information of the user (player as an example) in the real space. With this configuration, the information processing apparatus according to the present disclosure can perform control so as to achieve smooth progress of the application in various user participation modes.

Furthermore, according to one embodiment, the setting unit determines an extended trigger region within a predetermined range based on the position of the basic trigger region. This makes it possible to extend the function of the basic trigger region to the surroundings of the basic trigger region.

Furthermore, according to one embodiment, the setting unit determines the extended trigger region so as not to overlap each other. With this configuration, the information processing apparatus according to the present disclosure can avoid collision of position triggers between players.

Furthermore, according to one embodiment, the basic trigger region and the extended trigger region are regions each having a predetermined shape having a center. The setting unit determines an extended trigger region centered on a position on a line segment connecting the position of the user and the center of the basic trigger region, the position being at a predetermined distance from the center of the basic trigger region. With this configuration, the information processing apparatus according to the present disclosure can extend the function of the basic trigger region to a predetermined position.

Furthermore, according to one embodiment, the setting unit specifies a plurality of users belonging to the same group based on the group identification information specifying the group to which the user belongs. The setting unit determines the extended trigger region so that each of the extended trigger regions corresponding to the specified plurality of users is adjacent to the other extended trigger regions. With this arrangement, the information processing apparatus according to the present disclosure can smoothly control the progress of the game without hindering the immersive feeling into the game of the players participating in the game on a group-by-group basis.

Furthermore, according to one embodiment, the setting unit predicts whether more users than the maximum number of users set in the basic trigger region are present in the basic trigger region based on the context information including user's progress of application and the position information. When it is predicted that more users than the maximum number of users set in the basic trigger region are present in the basic trigger region, the setting unit presets, onto the storage unit, information defining the region for allocating the extended trigger region corresponding to the plurality of users belonging to the same group. With this configuration, the information processing apparatus according to the present disclosure can reliably set the position trigger on a group-by-group basis, and can maintain the distance between the players participating in the game on a group-by-group basis.

Furthermore, according to one embodiment, the setting unit determines an extended trigger region corresponding to the user, on a route along which each user is expected to move when heading for the basic trigger region. This makes it possible to achieve guidance of the player using the position trigger in accordance with restrictions in the real environment, such as a narrow passage or the flow of people in the real space.

Furthermore, according to one embodiment, the setting unit determines each of the extended trigger regions corresponding to a plurality of users belonging to each group on a route along which a plurality of users belonging to the same group is expected to move when heading for the basic trigger region. The route is assumed based on the group identification information and the context information. With this configuration, the information processing apparatus according to the present disclosure can implement guidance on a group-by-group basis while maintaining a short distance between players belonging to the group. In addition, it is possible to provide content related to LBE games such as three-dimensional objects without being disturbed by other groups.

Furthermore, according to one embodiment, an application (an example of this is an LBE game) controls the display of an object of Augmented Reality (AR) that superimposes additional information on a real space and augments the real environment perceived by humans. With this control, the information processing apparatus according to the present disclosure can perform control, in a game using the real space, so as to achieve smooth progress of the game on a group-by-group basis.

Furthermore, according to one embodiment, provision to the user is performed by using an object that is virtually displayed in space or an object that is projected to the floor surface. With this configuration, the information processing apparatus according to the present disclosure can flexibly change the mode of the position trigger.

Furthermore, according to one embodiment of the present disclosure, the object is provided to the user while reflecting the positional deviation between the basic trigger region and the extended trigger region. With this configuration, the information processing apparatus according to the present disclosure can perform control so that the players in the group can confirm the content at the same position.

Furthermore, the effects described in the present specification are merely illustrative or exemplary and are not limited. That is, the technology according to the present disclosure can exhibit other effects that are apparent to those skilled in the art from the description of the present specification in addition to or instead of the above effects.

Note that the present technology can also have the following configurations.

(1)

An information processing apparatus comprising
a setting unit that, based on basic trigger region information defining a basic trigger region which is to be a trigger of an occurrence of an event in an application that presents predetermined content to a user based on position information regarding the user within a real space, determines an extended trigger region having a predetermined positional relationship with the basic trigger region, and sets information defining the determined extended trigger region onto a storage unit.

(2)

The information processing apparatus according to (1), wherein
the setting unit determines the extended trigger region within a predetermined range based on the position of the basic trigger region.

(3)

The information processing apparatus according to (2), wherein
the setting unit determines the extended trigger region so as not to overlap each other.

(4)

The information processing apparatus according to (3), wherein
the basic trigger region and the extended trigger region are regions each having a predetermined shape having a center, and
the setting unit determines the extended trigger region centered on a position on a line segment connecting the position of the user and the center of the basic trigger region, the position being at a predetermined distance from the center of the basic trigger region.

(5)

The information processing apparatus according to any one of (1) to (4), wherein
the setting unit
specifies a plurality of users belonging to a same group based on group identification information that specifies a group to which the user belongs, and
determines the extended trigger region so that each of the extended trigger regions corresponding to the specified plurality of users is adjacent to the other extended trigger regions.

(6)

The information processing apparatus according to (5), wherein
in a case where it is predicted that more users than a maximum number of users set in the basic trigger region exist in the basic trigger region based on context information including progress of the application and on the position information, the setting unit presets, onto the storage unit, information defining a region for allocating the extended trigger regions corresponding to the plurality of users belonging to the same group.

(7)

The information processing apparatus according to (1), wherein the setting unit determines the extended trigger region corresponding to the user on a route along which each of the users is expected to move when heading for the basic trigger region.

(8)

The information processing apparatus according to (6), wherein the setting unit determines each of the extended trigger regions corresponding to the plurality of users belonging to each of groups, on a route along which the plurality of users belonging to the same group is expected to move when heading for the basic trigger region, based on the group identification information and the context information.

(9)

The information processing apparatus according to any one of (1) to (8), wherein the application controls display of an object of Augmented Reality (AR) that superimposes additional information on a real space and that augments a real environment perceived by humans.

(10)

The information processing apparatus according to (9), wherein the basic trigger region and the extended trigger region are provided to the user by using an object virtually displayed in space or an object projected to a floor surface.

(11)

The information processing apparatus according to (10), wherein the object is provided to the user while reflecting a positional deviation between the basic trigger region and the extended trigger region.

(12)

An information processing method comprising performing, by a processor included in an information processing apparatus, and based on basic trigger region information indicating a position of a basic trigger region which is to be a trigger of an occurrence of an event in an application that presents predetermined content to a user based on position information regarding the user within a real space, determination of an extended trigger region having a predetermined positional relationship with the basic trigger region, and setting of information defining the determined extended trigger region onto a storage unit.

(13)

An information processing program causing a computer to function as a setting unit that, based on basic trigger region information defining a basic trigger region which is to be a trigger of an occurrence of an event in an application that presents predetermined content to a user based on position information regarding the user within a real space, determines an extended trigger region having a predetermined positional relationship with the basic trigger region, and sets information defining the determined extended trigger region onto a storage unit.

REFERENCE SIGNS LIST

1 INFORMATION PROCESSING SYSTEM
2 COMMUNICATION NETWORK
10 LBE TERMINAL
20 LBE SERVER
110 SENSOR UNIT
111 OUTWARD CAMERA
112 9-dof (DEGREES OF FREEDOM) SENSOR
113 POSITIONING UNIT
114 BIOMETRIC INFORMATION DETECTION UNIT
120 DISPLAY UNIT
130 SPEAKER
140 COMMUNICATION UNIT
150 OPERATION INPUT UNIT
160 MICROPHONE
170 STORAGE UNIT
180 CONTROL UNIT
181 PHYSICAL INFORMATION ACQUISITION UNIT
182 LAYOUT PARAMETER CALCULATION UNIT
183 POSITION TRIGGER DETERMINATION UNIT
184 OUTPUT CONTROL UNIT
210 COMMUNICATION UNIT
220 STORAGE UNIT
230 SYSTEM CONTROL UNIT
231 CONTENT INFORMATION MANAGEMENT UNIT
232 POSITION TRIGGER MANAGEMENT UNIT
233 PLAYER INFORMATION MANAGEMENT UNIT
234 EXTENDED POSITION TRIGGER CALCULATION UNIT
235 PLAYER GROUP MANAGEMENT UNIT

The invention claimed is:

1. An information processing apparatus, comprising:
a central processing unit (CPU) configured to:
determine a first extended trigger region and a second extended trigger region that have a specific positional relationship with a basic trigger region, wherein
the determined first extended trigger region does not overlap with the determined second extended trigger region,
the determination of the first extended trigger region and the second extended trigger region is based on a basic trigger region information of the basic trigger region,
the basic trigger region information defines the basic trigger region which is a trigger of an occurrence of an event in an application, and
the application presents content to a user based on position information regarding the user within a real space; and
set information that defines-defining the determined first extended trigger region and the determined second extended trigger region onto a memory.

2. The information processing apparatus according to claim 1, wherein the CPU is further configured to determine the first extended trigger region within a specific range of the basic trigger region based on a position of the basic trigger region.

3. The information processing apparatus according to claim 2, wherein
each of the basic trigger region, the first extended trigger region, and the second extended trigger region have a shape that has a center,
the CPU is further configured to determine the first extended trigger region centered on a position on a line segment connecting a position of the user and the center of the basic trigger region, and
the position on the line segment is at a specific distance from the center of the basic trigger region.

4. The information processing apparatus according to claim 1, wherein the CPU is further configured to:
   specify a plurality of users of a same group based on group identification information, wherein
      the group identification information specifies a group to which the user belongs, and
      the plurality of users includes the user; and
   determine a plurality of extended trigger regions corresponding to the specified plurality of users, wherein
      the plurality of extended trigger regions includes the first extended trigger region and the second extended trigger region, and
      the first extended trigger region is adjacent to the second extended trigger region.

5. The information processing apparatus according to claim 4, wherein
   the CPU is further configured to:
      predict, based on context information and the position information, that a number of the plurality of users is more than a maximum number of users for the basic trigger region, wherein the context information indicates progress of the application; and
      preset, onto the memory, information defining a specific region for allocation of the plurality of extended trigger regions corresponding to the plurality of users belonging to the same group, wherein the preset of the information defining the specific region is based on the prediction.

6. The information processing apparatus according to claim 1, wherein
   the CPU is further configured to determine the first extended trigger region corresponding to the user on a route along which each of a plurality of users is expected to move to head for the basic trigger region, and
   the plurality of users includes the user.

7. The information processing apparatus according to claim 5, wherein
   the CPU is further configured to determine the plurality of extended trigger regions on a route along which the plurality of users belonging to the same group is expected to move to head for the basic trigger region, and
   the determination of the plurality of extended trigger regions on the route is based on the group identification information and the context information.

8. The information processing apparatus according to claim 1, wherein the application controls display of an object of Augmented Reality (AR) that superimposes additional information on the real space and that augments a real environment perceived by humans.

9. The information processing apparatus according to claim 8, wherein the basic trigger region, the first extended trigger region, and the second extended trigger region are provided to the user based on virtual display of the object in space or projection of the object to a floor surface.

10. The information processing apparatus according to claim 9, wherein the object reflects a positional deviation between the basic trigger region and the first extended trigger region.

11. An information processing method, comprising:
   determining, by a processor of an information processing apparatus, a first extended trigger region and a second extended trigger region that have a specific positional relationship with a basic trigger region, wherein
      the determined first extended trigger region does not overlap with the determined second extended trigger region,
      the determination of the first extended trigger region and the second extended trigger region is based on a basic trigger region information of the basic trigger region,
      the basic trigger region information indicates a position of the basic trigger region which is a trigger of an occurrence of an event in an application, and
      the application presents content to a user based on position information regarding the user within a real space; and
   setting, by the processor, information defining the determined first extended trigger region and the determined second extended trigger region onto a memory.

12. A non-transitory computer readable medium having stored thereon, computer executable instructions, which when executed by a computer, cause the computer to execute operations, the operations comprising:
   determining a first extended trigger region and a second extended trigger region that have a specific positional relationship with a basic trigger region, wherein
      the determined first extended trigger region does not overlap with the determined second extended trigger region,
      the determination of the first extended trigger region and the second extended trigger region is based on a basic trigger region information of the basic trigger region,
      the basic trigger region information defines the basic trigger region which is a trigger of an occurrence of an event in an application, and
      the application presents content to a user based on position information regarding the user within a real space; and
   setting information that defines the determined first extended trigger region and the determined second extended trigger region onto a memory.

13. An information processing apparatus, comprising:
   a central processing unit (CPU) configured to:
      determine an extended trigger region corresponding to a user on a route along which each of a plurality of users is expected to move to head for a basic trigger region, wherein
         the plurality of users includes the user,
         the extended trigger region has a specific positional relationship with the basic trigger region,
         the determination of the extended trigger region is based on a basic trigger region information of the basic trigger region,
         the basic trigger region information defines the basic trigger region which is a trigger of an occurrence of an event in an application, and
         the application presents content to the user based on position information regarding the user within a real space; and
      set information that defines the determined extended trigger region onto a memory.

14. An information processing apparatus, comprising:
   a central processing unit (CPU) configured to:
      determine an extended trigger region that has a specific positional relationship with a basic trigger region,
         the determination of the extended trigger region is based on a basic trigger region information of the basic trigger region, the basic trigger region information defines the basic trigger region which is a trigger of an occurrence of an event in an application, the application presents content to a user based on position information regarding the user within a real space, and the application controls display of an object of Augmented Reality (AR) that superimposes additional information on the real space and that augments a real environment perceived by humans; and set information that defines the determined extended trigger region onto a memory.

\* \* \* \* \*